(12) United States Patent
Zhang et al.

(10) Patent No.: US 12,412,312 B2
(45) Date of Patent: Sep. 9, 2025

(54) METHOD AND APPARATUS FOR CHART BASED MESH COMPRESSION

(71) Applicant: Tencent America LLC, Palo Alto, CA (US)

(72) Inventors: Xiang Zhang, Sunnyvale, CA (US); Chao Huang, Palo Alto, CA (US); Jun Tian, Belle Mead, NJ (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 272 days.

(21) Appl. No.: 17/964,613

(22) Filed: Oct. 12, 2022

(65) Prior Publication Data

US 2023/0177736 A1    Jun. 8, 2023

Related U.S. Application Data

(60) Provisional application No. 63/285,905, filed on Dec. 3, 2021.

(51) Int. Cl.
| | |
|---|---|
| G06T 9/00 | (2006.01) |
| G06T 7/60 | (2017.01) |
| G06T 17/20 | (2006.01) |

(52) U.S. Cl.
CPC .............. G06T 9/001 (2013.01); G06T 7/60 (2013.01); G06T 17/20 (2013.01)

(58) Field of Classification Search
None
See application file for complete search history.

(56) References Cited

U.S. PATENT DOCUMENTS

| 11,423,616 B1* | 8/2022 | Simon Kreuz | ......... G06T 15/04 |
| 2018/0253867 A1* | 9/2018 | Laroche | .................. G06T 17/20 |

(Continued)

FOREIGN PATENT DOCUMENTS

| KR | 10-2021-0126940 A | 10/2021 |
| WO | 2020/138353 A1 | 7/2020 |

(Continued)

OTHER PUBLICATIONS

Office Action received for Chinese Patent Application No. 202280008579.9, mailed on Apr. 29, 2024, 13 pages (6 pages of English Translation and 7 pages of Original Document).

(Continued)

*Primary Examiner* — James A Thompson
(74) *Attorney, Agent, or Firm* — ArentFox Schiff LLP

(57) ABSTRACT

Aspects of the disclosure provide methods and apparatuses for mesh coding. In some examples, an apparatus for mesh coding includes processing circuitry. The processing circuitry receives a bitstream carrying a 3D mesh frame. The 3D mesh frame represents a surface of an object with polygons, the polygons are defined by vertices and edges connecting the vertices, the 3D mesh frame is parameterized into a plurality of 2D charts in a 2D UV atlas. The processing circuitry determines respective chart based coding modes for the plurality of 2D charts according to one or more indices decoded from the bitstream, and decodes, from the bitstream, at least respective geometry information associated with the plurality of 2D charts according to the respective chart based coding modes. The processing circuitry reconstructs the 3D mesh frame according to the respective geometry information associated with the plurality of 2D charts.

20 Claims, 22 Drawing Sheets

(56) References Cited

U.S. PATENT DOCUMENTS

2022/0353532 A1* 11/2022 Zakharchenko ...... G06T 19/006
2023/0050860 A1* 2/2023 Ilola .................... H04N 19/597
2023/0068178 A1* 3/2023 Schwarz .............. H04N 13/388
2024/0265638 A1* 8/2024 Hayashi ............... H04N 19/597

FOREIGN PATENT DOCUMENTS

| WO | 2020/175709 A1 | 9/2020 |
| WO | 2020/187283 A1 | 9/2020 |
| WO | 2021/136876 A1 | 7/2021 |
| WO | 2023/039397 A1 | 3/2023 |

OTHER PUBLICATIONS

Office Action received for Japanese Patent Application No. 2023-556553, mailed on Oct. 7, 2024, 6 pages (3 pages of English Translation and 3 pages of Original Document).

Extended European Search Report and Search Opinion received for European Application No. 22902301.5, mailed on Feb. 28, 2025, 9 pages.

Graziosi et al., "[V-PCC][EE2.6-related] Mesh Patch Data", 132. MPEG Meeting, Motion Picture Expert Group or ISO/IEC JTC1/SC29/WG11, XP030292889, No. m55368, Oct. 7, 2020, 14 pages.

Zhang et al., "[V-CG] Tencent's Dynamic Mesh Coding CfP Response", 138. MPEG Meeting, Motion Picture Expert Group or ISO/IEC JTC1/SC29/WG11, XP030300732, No. m59295, Mar. 25, 2022, pp. 1-5.

Office Action received for Japanese Patent Application No. 2023-556553, mailed on May 1, 2025, 6 pages (3 pages of English Translation and 3 pages of Original Document).

* cited by examiner

METHOD AND APPARATUS FOR CHART BASED MESH COMPRESSION

INCORPORATION BY REFERENCE

This present application claims the benefit of priority to U.S. Provisional Application No. 63/285,905, "Method and Apparatus for Chart Based Mesh Compression" filed on Dec. 3, 2021. The entire disclosure of the prior application is hereby incorporated by reference in its entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh coding (e.g., compression and decompression). In some examples, an apparatus for mesh coding includes processing circuitry. The processing circuitry receives a bitstream carrying a three dimensional (3D) mesh frame. The 3D mesh frame represents a surface of an object with polygons, the polygons are defined by vertices and edges connecting the vertices, the 3D mesh frame is parameterized into a plurality of two dimensional (2D) charts in a 2D UV atlas. The vertices are mapped to 2D vertices in the 2D UV atlas, the 2D vertices form the plurality of 2D charts in the 2D UV atlas. The processing circuitry determines respective chart based coding modes for the plurality of 2D charts according to one or more indices decoded from the bitstream, and decodes, from the bitstream, at least respective geometry information associated with the plurality of 2D charts according to the respective chart based coding modes. The processing circuitry reconstructs the 3D mesh frame according to the respective geometry information associated with the plurality of 2D charts.

In some embodiments, the chart based coding modes include at least a sampling based coding mode, a reordering based coding mode and a raw chart coding mode.

In some examples, in response to a first 2D chart of the plurality of 2D charts being associated with the sampling based coding mode, the processing circuitry decodes, using an image decoder and/or a video decoder, a first geometry map from the bitstream, and determines, 3D coordinates and UV coordinates of first vertices in the first 2D chart according to the first geometry map.

In some examples, in response to a second 2D chart of the plurality of 2D charts being associated with the reordering based coding mode, the processing circuitry decodes, using an image decoder and/or a video decoder, a second geometry map, and an UV map from the bitstream, determines, 3D coordinates of second vertices in the second 2D chart according to the second geometry map, and determines, UV coordinates of the second vertices in the second 2D chart according to the UV map.

In some examples, the processing circuitry decodes, a combined 2D geometry map from the bitstream, the combined 2D geometry map includes a first 2D map for a first 2D chart in the sampling based coding mode, and a second 2D map for a second 2D chart in the reordering based coding mode. The processing circuitry decodes a first signal indicating a first position for the first 2D map in the combined 2D geometry map, and a second signal indicating a second position for the second 2D map in the combined 2D geometry map. Then, the processing circuitry determines, according to the sampling based coding mode, first geometry information associated with the first 2D chart based on the first 2D map at the first position of the combined 2D geometry map and determines, according to the reordering based coding mode, second geometry information associated with the second 2D chart based on the second 2D map at the second position of the combined 2D geometry map.

In some examples, in response to a third 2D chart of the plurality of 2D charts being associated with the raw chart coding mode, the processing circuitry decodes, from the bitstream, UV coordinates and 3D coordinates of third vertices of the third 2D chart without using an image decoder or a video decoder.

In an example, the processing circuitry decodes an index from a sequence header for a sequence of 3D mesh frames including the 3D mesh frame, the index in the sequence header indicates a chart based coding mode for the plurality of 2D charts, and other 2D charts parameterized from other 3D mesh frames in the sequence of 3D mesh frames.

In another example, the processing circuitry decodes an index from a frame header for the 3D mesh frame, the index in the frame header indicates a chart based coding mode respectively for the plurality of 2D charts.

In another example, the processing circuitry decodes an index from a first header of a first portion of the bitstream for carrying a first mesh segment of the 3D mesh frame, the first mesh segment is parameterized into first one or more 2D charts in the plurality of 2D charts, the index indicates a chart based coding mode respectively for the first one or more 2D charts.

In some examples, the processing circuitry decodes respective indices associated with the plurality of 2D charts, the respective indices indicate the respective chart based coding modes for the plurality of 2D charts.

Aspects of the disclosure also provide a non-transitory computer-readable medium storing instructions which when executed by a computer cause the computer to perform any one or a combination of the methods for mesh coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
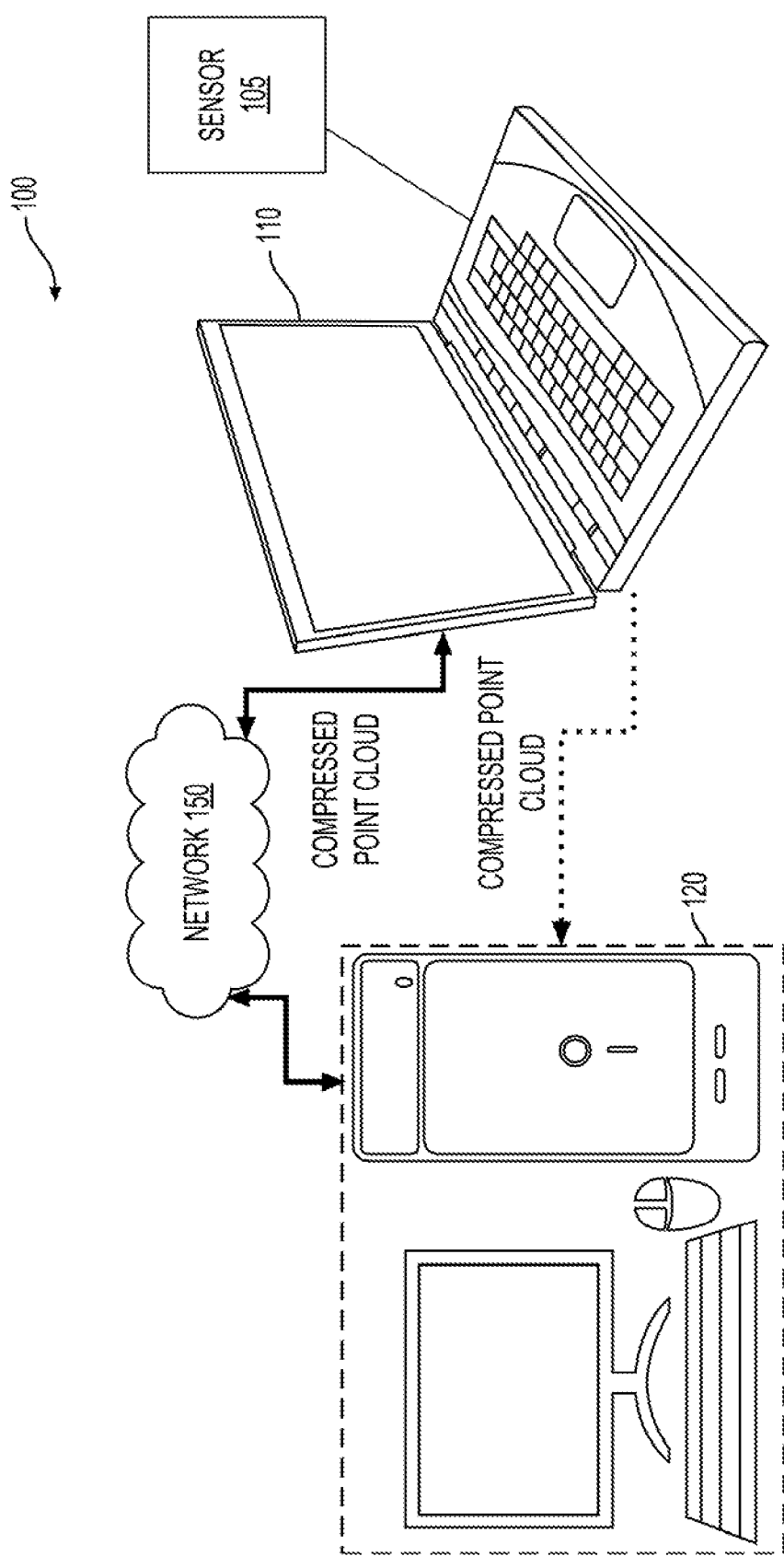
FIG. 1 shows a block diagram of a communication system in some examples.

Aspects of the disclosure provide techniques in the field of three dimensional (3D) media processing.

Technology developments in 3D media processing, such as advances in three dimensional (3D) capture, 3D modeling, and 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources.

According to some aspects of the disclosure, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

According to some aspects of the disclosure, some coding tools for point cloud compression (PCC) can be used for mesh compression. For example, a mesh can be re-meshed to generate a new mesh that the connectivity information of the new mesh can be inferred. The vertices of the new mesh, and the attributes associated with the vertices of the new mesh can be considered as points in a point cloud and can be compressed using PCC codecs.

Point clouds can be used to reconstruct an object or a scene as a composition of points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use existing video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, the Internet, and the like.

Figure 2:
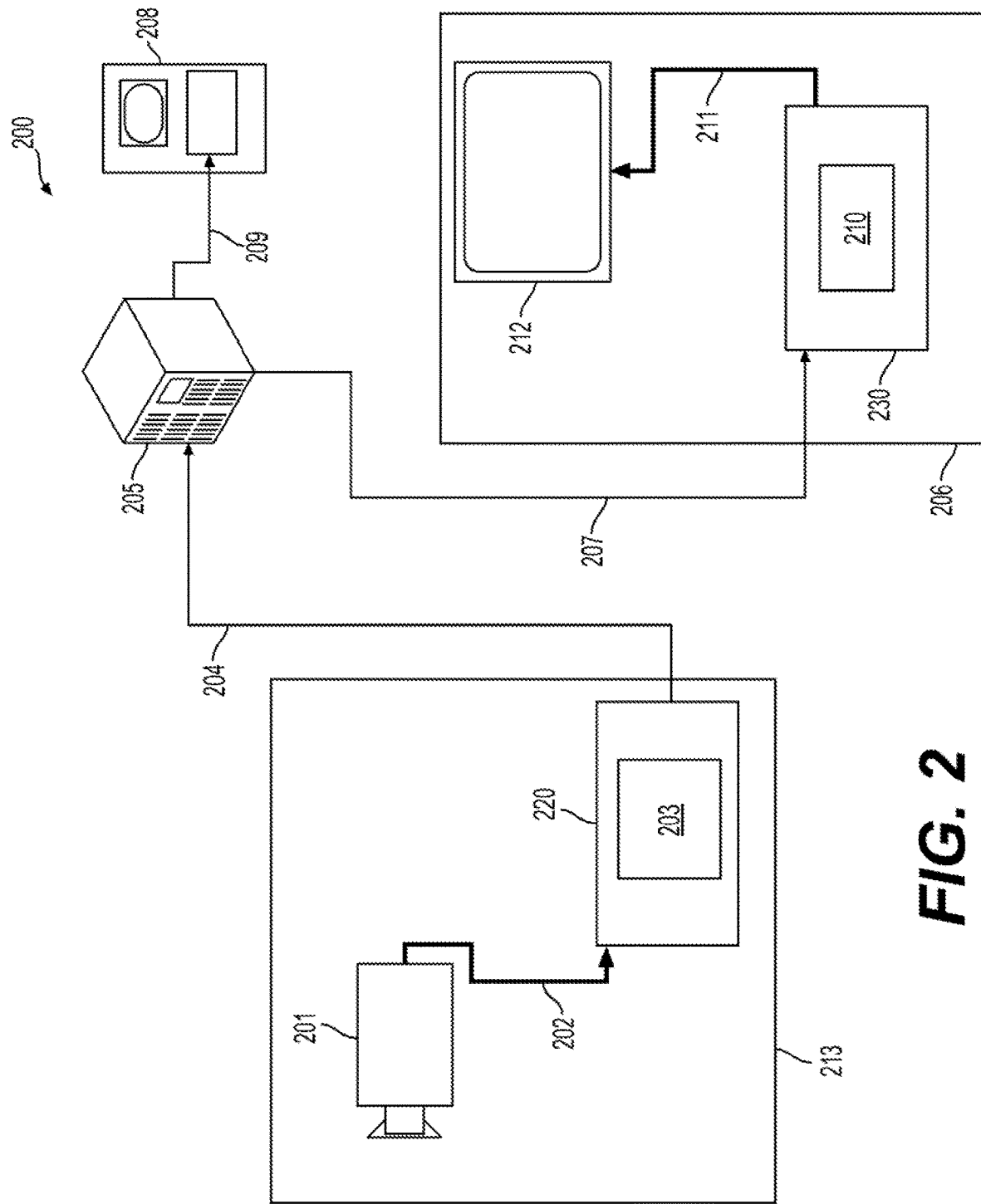
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
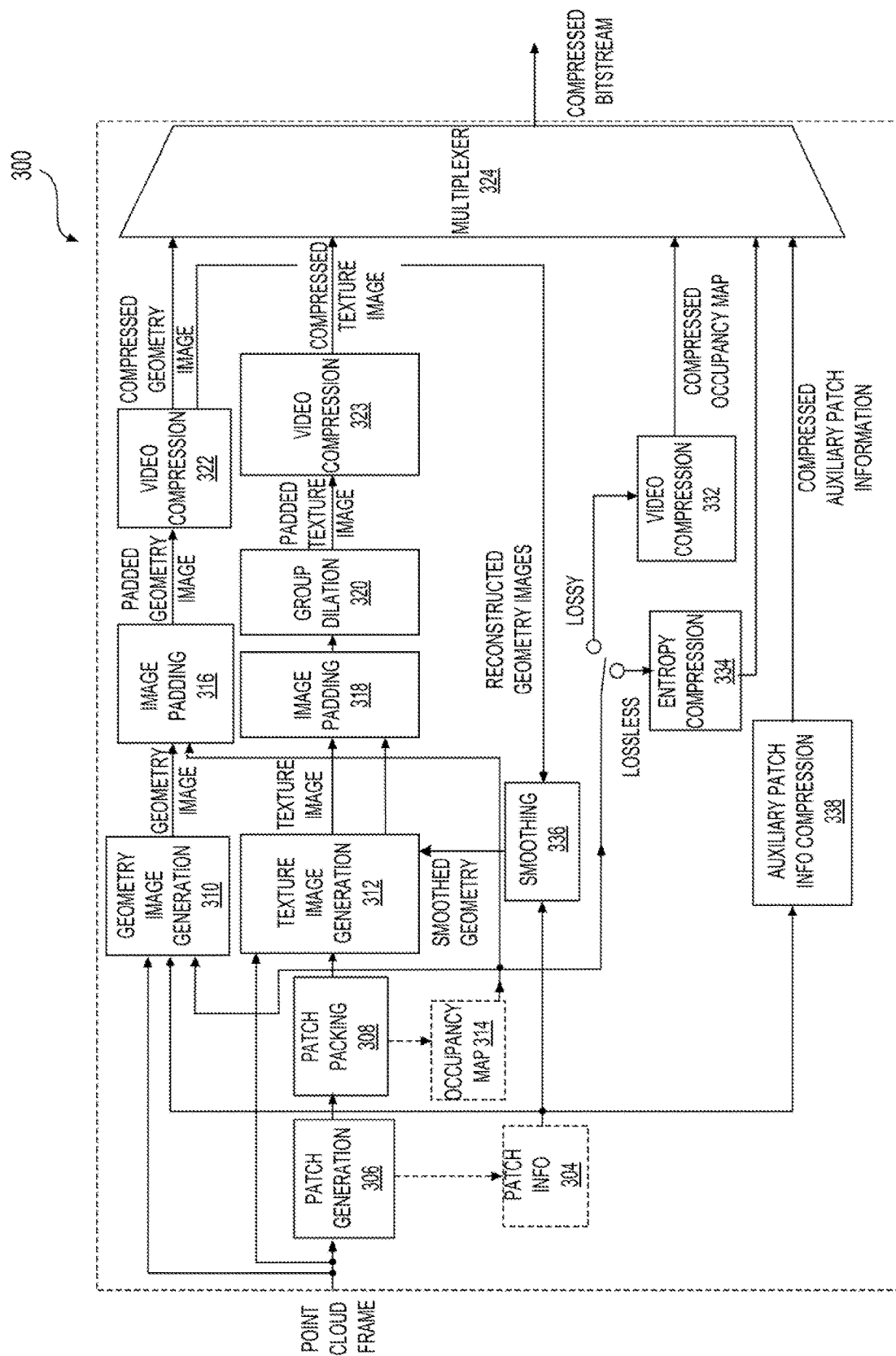
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
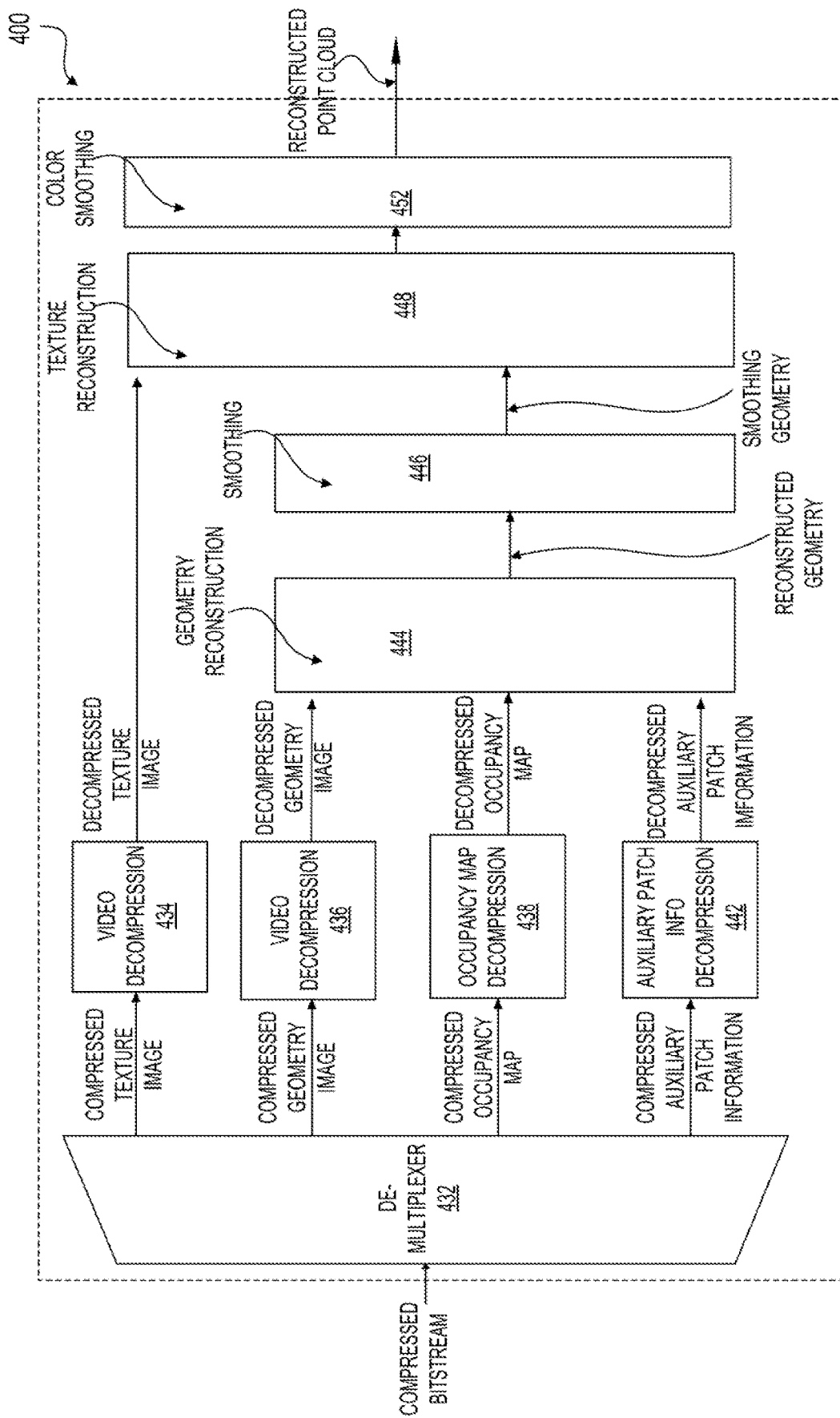
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
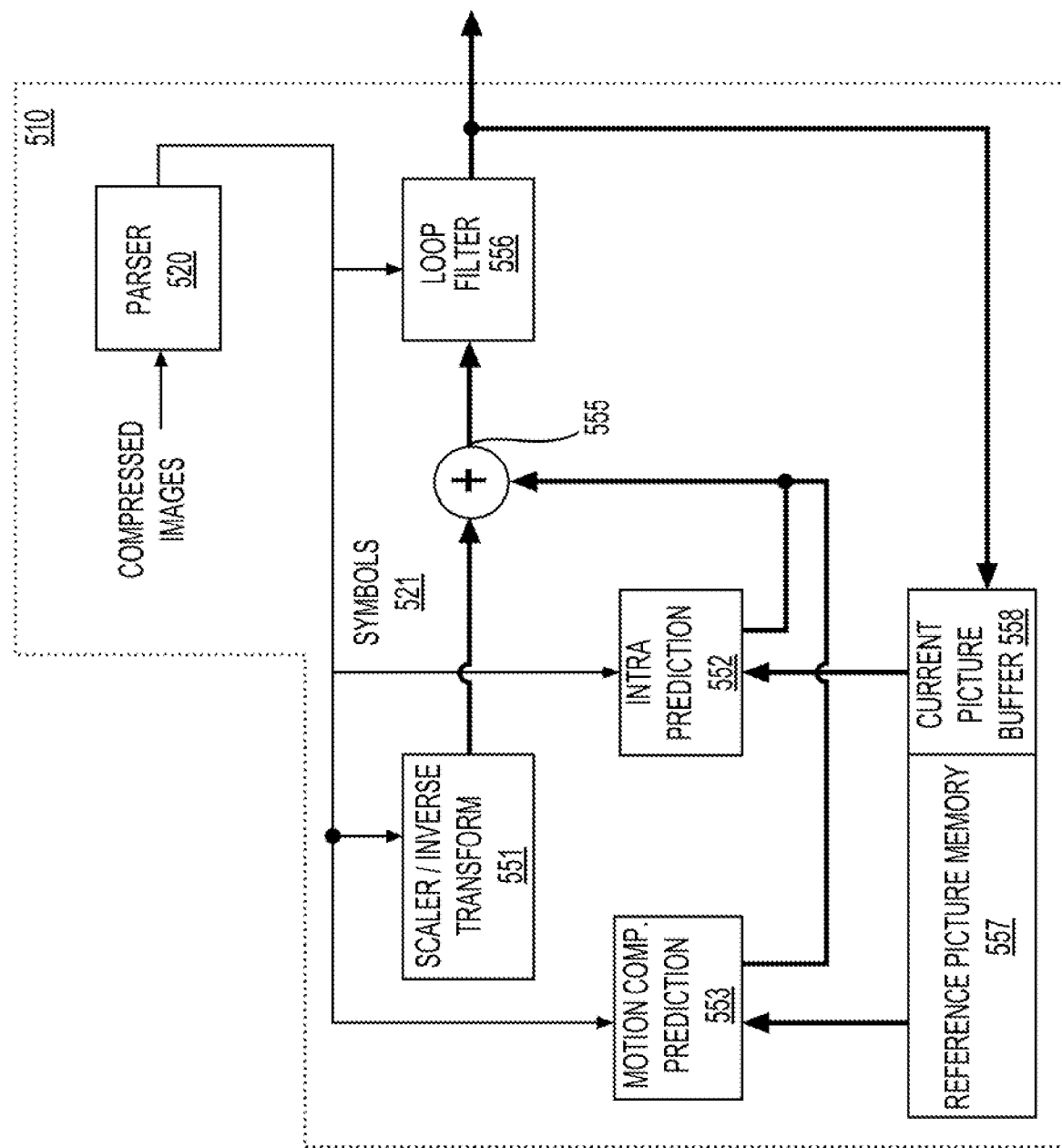
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
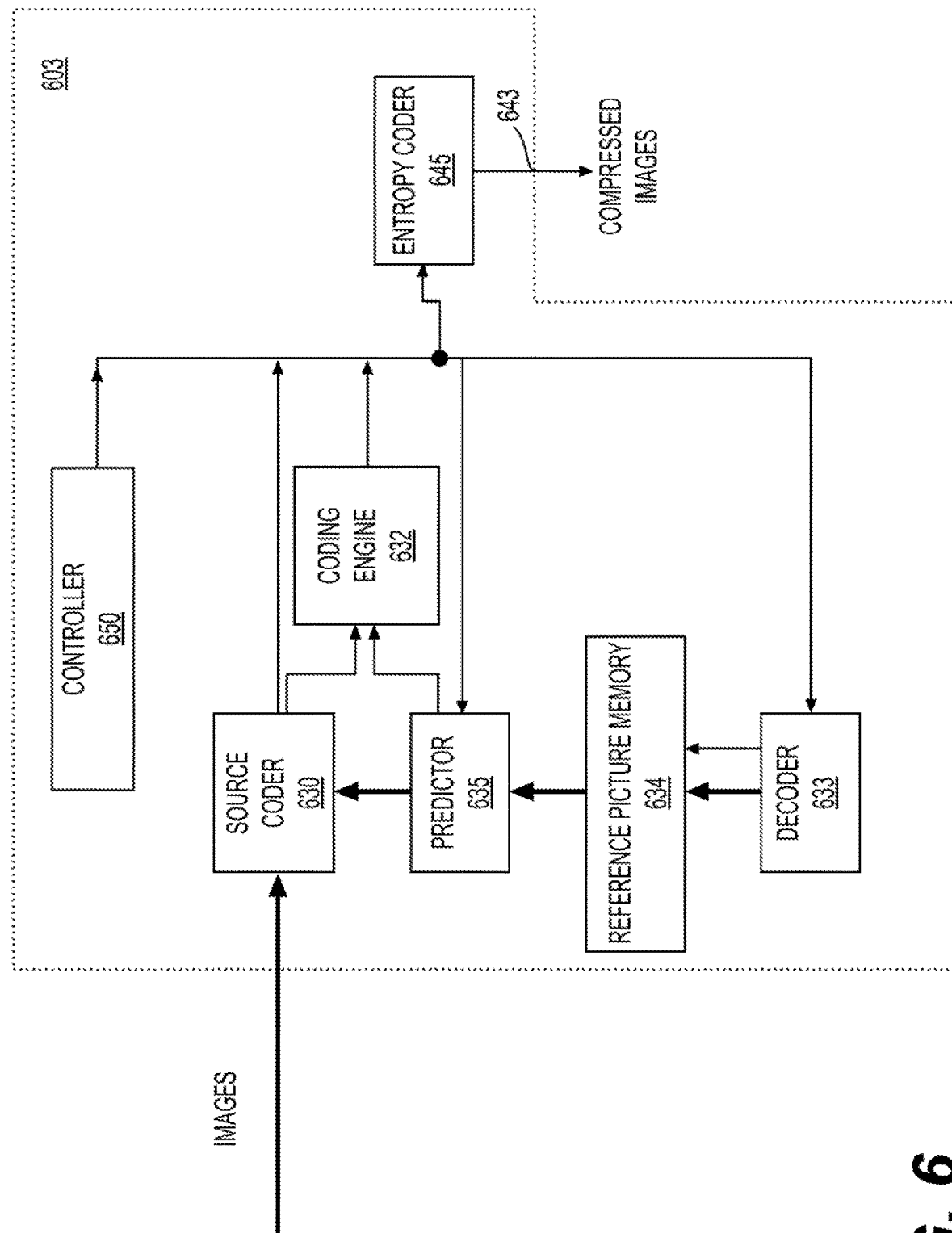
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
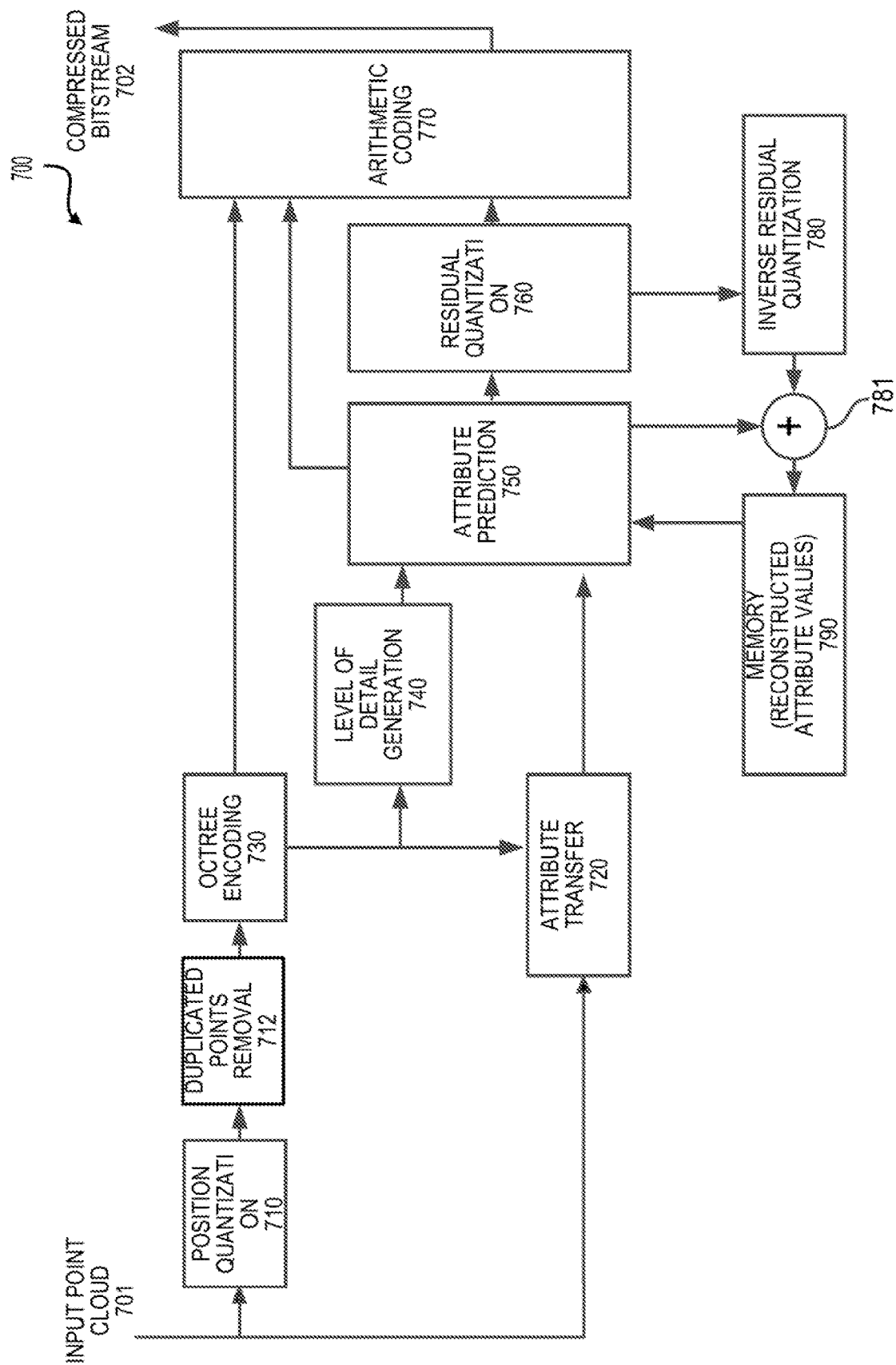
FIG. 7 shows a block diagram of an encoder for encoding point cloud frames in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
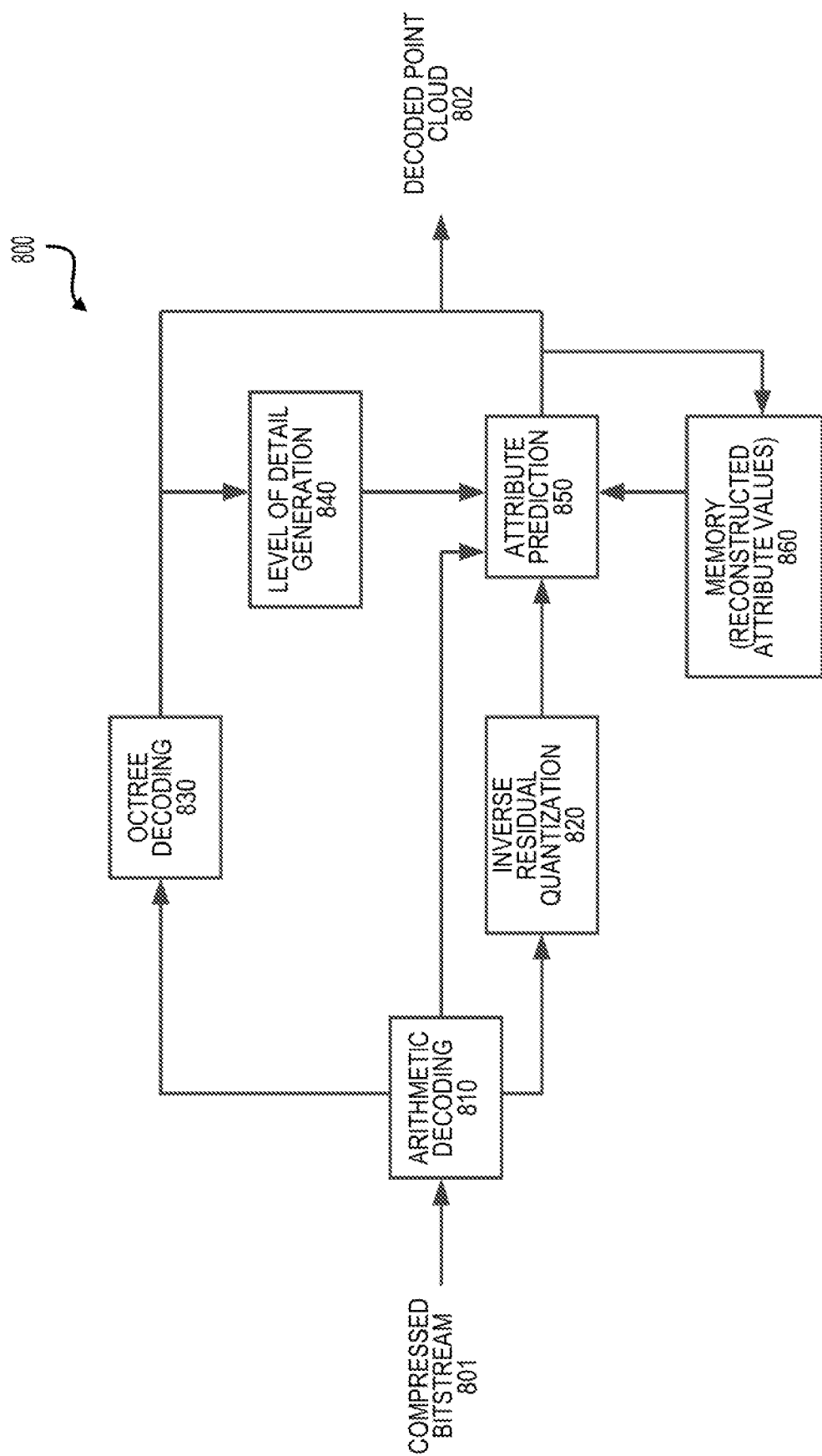
FIG. 8 shows a block diagram of a decoder for decoding a compressed bitstream carrying point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, mesh compression can use coding tools different from PCC coding tools or can use PCC coding tools, such as above PCC (e.g., G-PCC, V-PCC) encoders, above PCC (e.g., G-PCC, V-PCC) decoders, and the like.

A mesh (also referred to as a mesh model, a mesh frame) of an object can include polygons that describe the surface of the object. Each polygon can be defined by vertices of the polygon in 3D space and edges that connect the vertices into the polygon. The information of how the vertices are connected (e.g., information of the edges) is referred to as connectivity information. In some examples, a mesh of an object is formed by connected triangles that describe the surface of the object. Two triangles sharing an edge are referred to as two connected triangles. In some other examples, a mesh of an object is formed by connected quadrilaterals. Two quadrilaterals sharing an edge can be referred to as two connected quadrilaterals. It is noted that meshes can be formed by other suitable polygons.

In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices, and are also referred to as 3D coordinates. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

According to an aspect of the disclosure, some techniques that are referred to as UV mapping or mesh parameterization are used to map surfaces of a mesh in the 3D domain to 2D domain. In some examples, a mesh is partitioned into patches in the 3D domain. A patch is a contiguous subset of the mesh with a boundary formed of boundary edges. A boundary edge of a patch is an edge that belongs to only one polygon of the patch, and is not shared by two adjacent polygons in the patch. Vertices of boundary edges in a patch are referred to as boundary vertices of the patch, and non-boundary vertices in a patch can be referred to as interior vertices of the patch in some examples.

In some examples, a mesh of an object is formed by connected triangles, and the mesh can be partitioned into patches, each patch is a subset of the connected triangles. A boundary edge of a patch is an edge that belongs to only one triangle in the patch and is not shared by adjacent triangles in the patch. Vertices of boundary edges in a patch are referred to as boundary vertices of the patch, and non-boundary vertices in a patch can be referred to as interior vertices of the patch in some examples. A boundary loop includes a sequence of boundary vertices, boundary edges formed by the sequence of boundary vertices can form a loop that is referred to as a boundary loop.

According to an aspect of the disclosure, the patches are parameterized respectively into 2D shapes (also referred to as UV patches, or 2D charts, or 2D patches) in some examples. The 2D shapes can be packed (e.g., oriented and placed) into 2D maps that are also referred to as 2D UV atlases in some examples. In some examples, the 2D maps can be further processed using 2D image or video processing techniques.

In an example, a UV mapping technique generates a UV atlas (also referred to as UV map, 2D UV atlas) and one or more texture atlas (also referred to as texture map) in 2D corresponding to patches of a 3D mesh. The UV atlas includes assignments of 3D vertices of the 3D mesh to 2D points in a 2D domain (e.g., a rectangular). The UV atlas is a mapping between coordinates of the 3D surface to coordinates of 2D domain. In an example, a point in the UV atlas at a 2D coordinates (u,v) has a value that is formed by coordinates (x, y, z) of a vertex in the 3D domain. In an example, a texture atlas includes color information of the 3D mesh. For example, a point in the texture atlas at the 2D coordinates (u,v) (which has a 3D value of (x,y,z) in the UV atlas) has a color that specifies the color attribute of a point at (x, y, z) in the 3D domain. In some examples, the coordinates (x, y, z) in the 3D domain are referred to as 3D coordinates, or xyz coordinates, and the 2D coordinates (u,v) are referred to as uv coordinates or UV coordinates.

According to some aspects of the disclosure, mesh compression can be performed various techniques, such as direct coding techniques, sampling based coding techniques, reordering based coding techniques.

In the direct coding techniques, the geometry information (e.g., 3D coordinates, UV coordinates and the like), attribute information, and connectivity information of the vertices can be directly coded into the bitstream. In some examples, predictive coding techniques can be applied to reduce the data redundancy. For example, previously coded values can be used to predict the current value. The prediction can be from either the current mesh frame (also referred to as intra frame spatial prediction) or previous frames (also referred to as inter frame temporal prediction). For example, the parallelogram prediction can be used to predict a current geometry position from three previously coded geometry (UV coordinates and/or 3D coordinates) positions. In some examples, the prediction residuals can be coded by arithmetic coding. Further, context information from previous coded values can be used to improve the coding efficiency.

In the sampling based coding techniques and reordering based coding techniques, a 3D mesh can be converted to one or more 2D maps (also referred to as 2D atlas in some examples), and then the 2D maps can be encoded using image or video codecs. Some sampling based coding techniques will be described with reference to FIGS. 9-13, and some reordering based coding techniques will be described with reference to FIGS. 14A-14E, 15, and 16A-16D.

According to an aspect of the disclosure, some sampling based techniques can generate 2D maps from a 3D mesh.

Figure 9:
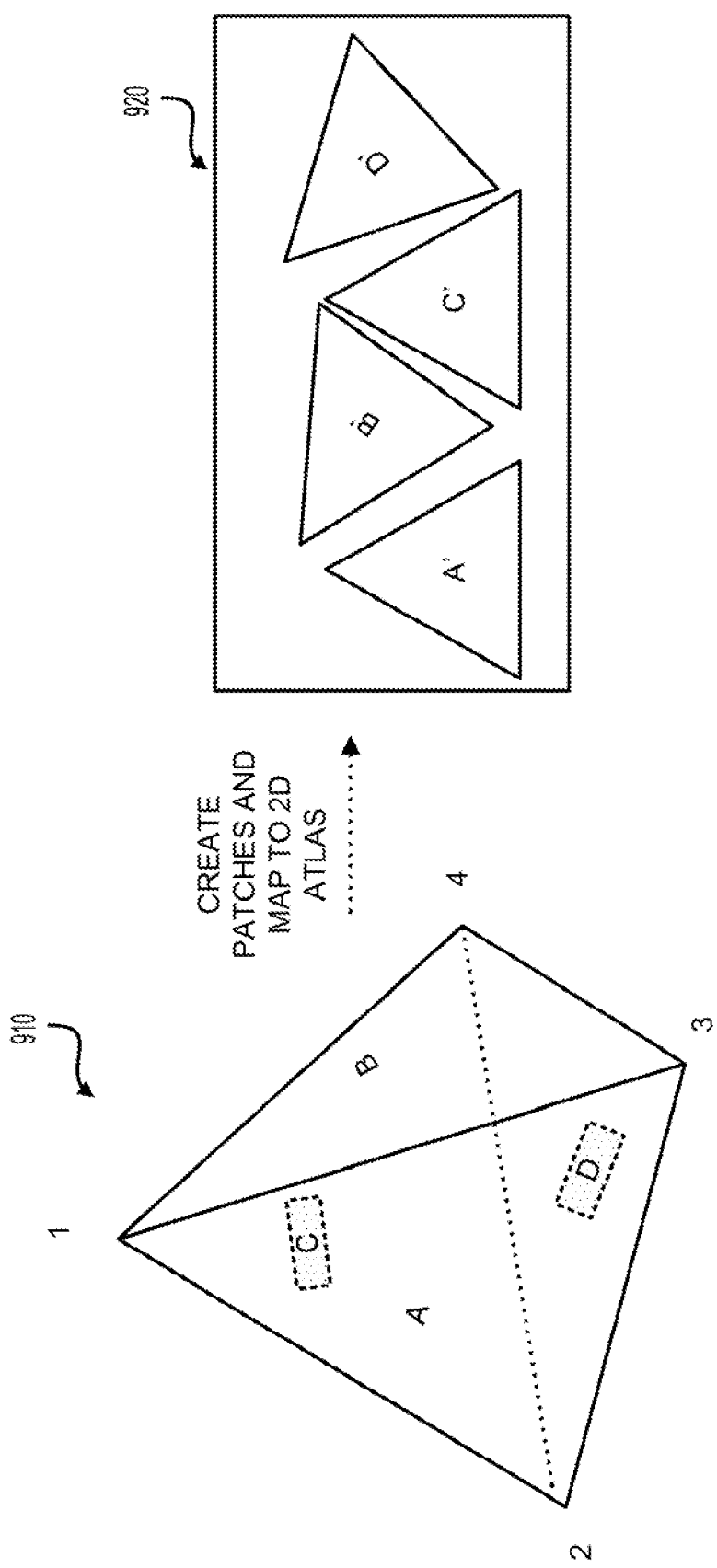
FIG. 9 shows a diagram illustrating a mapping of a mesh to an atlas in some examples.

FIG. 9 shows a diagram illustrating a mapping of a 3D mesh (910) to a 2D atlas (920) in some examples. In FIG. 9 example, the 3D mesh (910) includes four vertices 1-4 that form four patches A-D. Each of the patches has a set of vertices and associated attribute information. For example, the patch A is formed by the vertices 1, 2 and 3 that are connected into a triangle; the patch B is formed by the vertices 1, 3 and 4 that are connected into a triangle; the patch C is formed by the vertices 1, 2 and 4 that are connected into a triangle; and the patch D is formed by vertices 2, 3 and 4 that are connected into a triangle. In some examples, the vertices 1, 2, 3 and 4 can have respective attributes, and the triangles formed by the vertices 1, 2, 3 and 4 can have respective attributes.

In an example, the patches A, B, C and D in 3D are mapped to a 2D domain, such as the 2D atlas (920) that is also referred to as UV atlas (920) or map (920). For example, the patch A is mapped to a 2D shape (also referred to as UV patch) A' in the map (920), the patch B is mapped to a 2D shape (also referred to as UV patch) B' in the map (920), the patch C is mapped to a 2D shape (also referred to as UV patch) C' in the map (920), and the patch D is mapped to a 2D shape (also referred to as UV patch) D' in the map (920). In some examples, the coordinates in 3D domain are referred to as (x, y, z) coordinates, the coordinates in 2D domain, such as the map (920), are referred to as UV coordinates. A vertex in the 3D mesh can have corresponding UV coordinates in the map (920).

The map (920) can be geometry map with geometry information, or can be texture map with color, normal, textile, or other attribute information, or can be occupancy map with occupancy information.

While each patch is represented by a triangle in the FIG. 9 example, it is noted that a patch can include any suitable number of vertices that are connected to form a contiguous subset of the mesh. In some examples, the vertices in a patch are connected into triangles. It is noted that the vertices in a patch can be connected using other suitable shapes.

In an example, the geometry information of the vertices can be stored into a 2D geometry map. For example, the 2D geometry map stores the (x, y, z) coordinates of sampling points at a corresponding point in the 2D geometry map. For example, a point in the 2D geometry map at (u, v) position has a vector value of 3 components respectively corresponding to the x, y and z values of a corresponding sampling point in the 3D mesh.

According to an aspect of the disclosure, areas in a map may not be fully occupied. For example, in FIG. 9, the areas that are outside the 2D shapes A', B', C' and D' are undefined. The sample values of the areas that are outside the 2D shapes A', B', C' and D' after decoding can be discarded. In some cases, an occupancy map is used to store some extra information for each pixel, such as storing a binary value to identify if a pixel belongs to a patch or is undefined.

According to an aspect of the disclosure, a dynamic mesh is a mesh where at least one of the components (geometry information, connectivity information, mapping information, vertex attributes and attribute maps) varies with time. A dynamic mesh can be described by a sequence of meshes (also referred to as mesh frames). The dynamic mesh may require a large amount of data since the dynamic mesh may include a significant amount of information changing over time. Compression technologies of meshes can allow efficient storage and transmission of media contents in the mesh representation.

In some examples, a dynamic mesh can have constant connectivity information, time varying geometry and time varying vertex attributes. In some examples, a dynamic mesh can have time varying connectivity information. In an example, digital content creation tools usually generate dynamic meshes with time varying attribute maps and time varying connectivity information. In some examples, volumetric acquisition techniques are used to generate dynamic meshes. The volumetric acquisition techniques can generate a dynamic mesh with time varying connectivity information especially under real time constraints.

Some techniques are used for mesh compression. In some examples, UV atlas sampling and V-PCC can be used for mesh compression. For example, the UV atlas is sampled on regular grids to generate a geometry image with regular grid samples. Connectivity of the regular grid samples can be inferred. The regular grid samples can be considered as points in a point cloud, and thus can be coded using PCC codec, such as V-PCC codec.

According to an aspect of the disclosure, in order to compress the 3D mesh information efficiently, 2D maps, such as a geometry map, a texture map (also referred to as attribute map in some examples), an occupancy map, and the like may be down-sampled before being coded.

Figure 10:
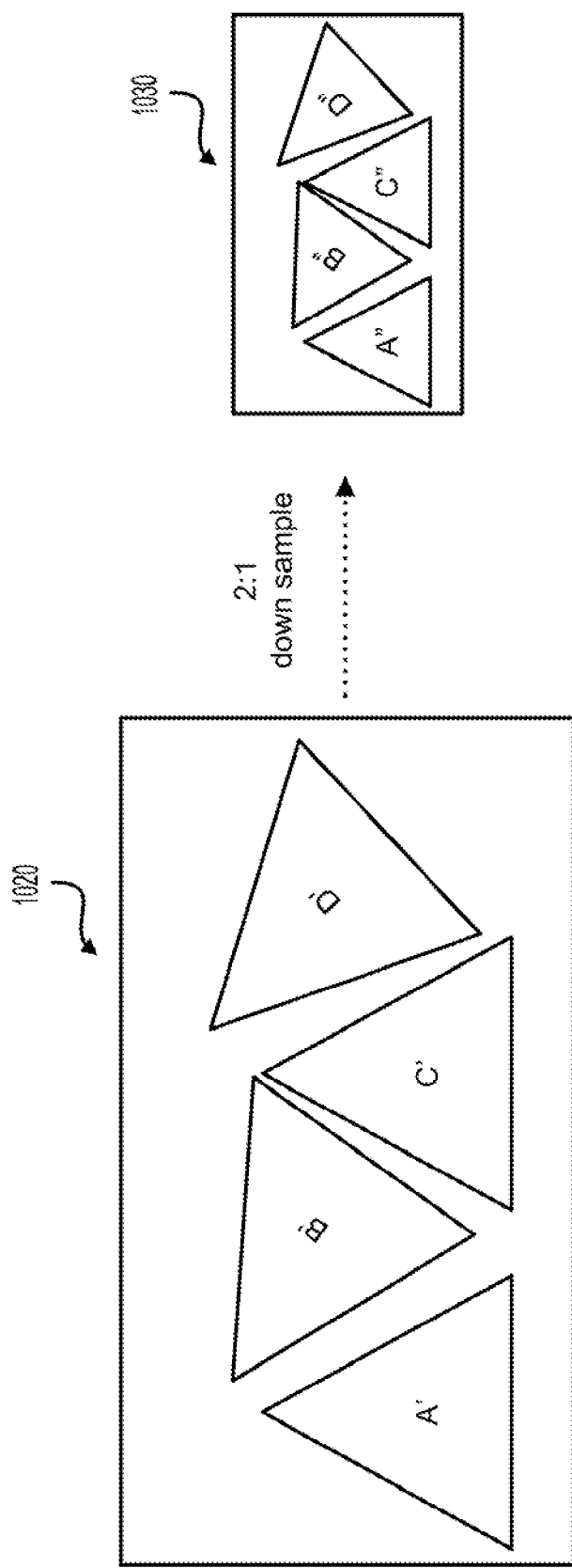
FIG. 10 shows a diagram illustrating down sampling in some examples.

FIG. 10 shows a diagram illustrating down sampling in some examples. In FIG. 10, a map (1020) is down-sampled by a factor of 2 in both horizontal direction and the vertical direction, and a down-sampled map (1030) is generated accordingly. The width (e.g., the number of pixels in the horizontal direction) of the down-sampled map (1030) is ½ of the width (e.g., the number of pixels in the horizontal direction) of the map (1020), and height (e.g., the number of pixels in the vertical direction) of the down-sampled map (1030) is ½ of the height (e.g., the number of pixels in the vertical direction) of the map (1020).

In FIG. 10, the map (1020) includes 2D shapes (also referred to as UV patches) A', B', C' and D', and the down sampled map (1030) includes sampled 2D shapes A", B", C" and D" respectively corresponding to the 2D shapes A', B', C' and D'. The down-sampled map (1030) is then coded by an image or video encoder at the mesh encoder side in some examples.

In some examples, at the mesh decoder side, the down-sampled maps are decoded. After the decoding of the down-sampled maps, the down-sampled maps are recovered to the original resolution (e.g., the original number of pixels in the vertical direction and the original number of pixels in the horizontal direction) for reconstructing the 3D mesh.

Generally, a dynamic mesh sequence requires a large amount of data since the dynamic mesh sequence may consist of a significant amount of information changing over time. A sampling step applied to the 2D maps (e.g., UV atlas, attribute maps) can help to reduce the bandwidth needed to represent the mesh information. However, the sampling step can also remove key information such as some critical geometry shape of the 3D mesh during the down-sampling.

In some examples, adaptive sampling techniques can be used to process the 2D atlas (also referred to as maps in 2D) without loosing too much important information. The adaptive sampling techniques can be used for static mesh (one mesh frame or mesh content does not change over time) compression and dynamic mesh compression. The various adaptive sampling techniques can be applied individually or by any form of combinations. In the following description, the adaptive sampling methods are applied to 2D atlas (e.g., maps in 2D), which can be either the geometry map or the attribute (texture) map, or both.

Figure 11:
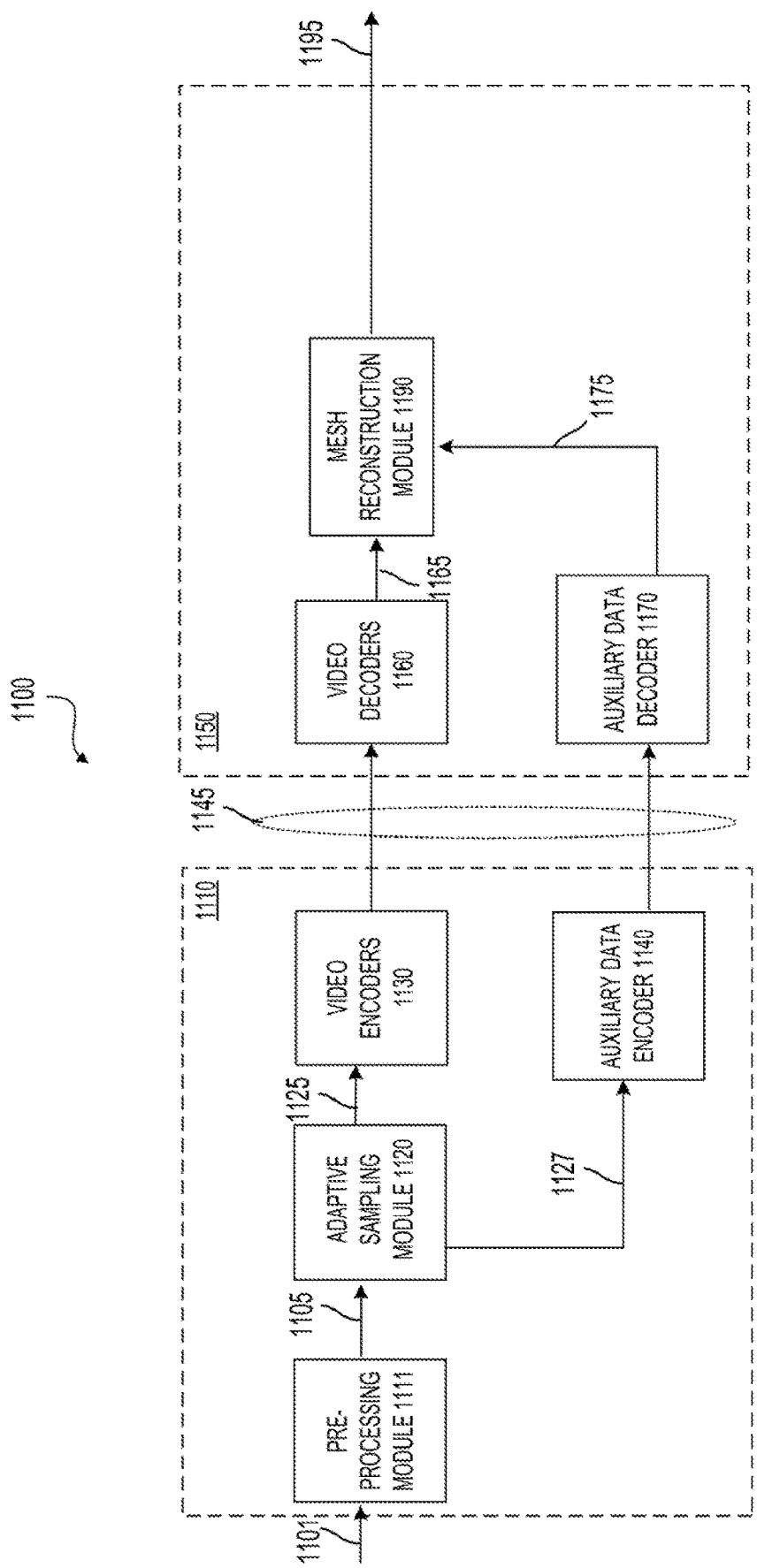
FIG. 11 shows a diagram of a framework for mesh compression according to some embodiments of the disclosure.

FIG. 11 shows a diagram of a framework (1100) for mesh compression according to some embodiments of the disclosure. The framework (1100) includes a mesh encoder (1110) and a mesh decoder (1150). The mesh encoder (1110) receives an input mesh (1101) (a mesh frame in case of a dynamic mesh processing), and encodes the input mesh (1101) into a bitstream (1145), and the mesh decoder (1150) decodes the bitstream (1145) to generate a reconstructed mesh (1195) (a reconstructed mesh frame in case of a dynamic mesh processing).

The mesh encoder (1110) can be any suitable device, such as a computer, a server computer, a desktop computer, a laptop computer, a tablet computer, a smart phone, a gaming device, an AR device, a VR device, and the like. The mesh decoder (1150) can be any suitable device, such as a computer, a client computer, a desktop computer, a laptop computer, a tablet computer, a smart phone, a gaming device, an AR device, a VR device, and the like. The bitstream (1145) can be transmitted from the mesh encoder (1110) to the mesh decoder (1150) via any suitable communication network (not shown).

In the FIG. 11 example, the mesh encoder (1110) includes a pre-processing module (1111), an adaptive sampling module (1120), video encoders (1130) and an auxiliary data encoder (1140) coupled together. The video encoders (1130) are configured to encode image or video data, such as 2D maps in a representation for a 3D mesh.

In the FIG. 11 example, the pre-processing module (1111) is configured to perform suitable operations onto the input mesh (1101) to generate a mesh with UV atlas (1105). For example, the pre-processing module (1111) can perform a series of operations that includes tracking, remeshing, parameterization, and voxelization. In FIG. 11 example, the series of operations can be encoder-only and is not a part of the decoding process. In some examples, the mesh with UV atlas (1105) includes 3D location information of vertices, a UV atlas that maps the 3D location information to 2D, and other 2D attribute maps (e.g., 2D color map, and the like).

It is noted that in some examples, the input mesh (1101) is in the form of a mesh with UV atlas, then the pre-processing module (1111) can forward the input mesh (1101) to be the mesh with UV atlas (1105).

The adaptive sampling module (1120) receives the mesh with UV atlas (1105) and performs adaptive sampling to generate adaptively sampled maps (1125). In some examples, the adaptive sampling module (1120) can use various techniques to detect characteristics in the maps or in different regions of the maps, such as information density in the maps, and determine different sampling rates for sampling the maps or different regions of the maps based on the characteristics. Then, the 2D maps can be sampled according to the different sampling rates to generate the adaptively sampled maps (1125). The adaptively sampled maps (1125) can include a geometry map (also referred to as geometry image in some examples), an occupancy map, other attributes maps (e.g., a color map), and the like.

The video encoders (1130) can encode the adaptively sampled maps (1125) into the bitstream (1145) using the image encoding and/or video encoding techniques.

The adaptive sampling module (1120) also generates auxiliary data (1127) that indicates assistance information used for the adaptive sampling. The auxiliary data encoder (1140) receives the auxiliary data (1127), and encodes the auxiliary data (1127) into the bitstream (1145).

The operations of the adaptive sampling module (1120) and the auxiliary data encoder (1140) will be further described in the present disclosure.

In the FIG. 11 example, the bitstream (1145) is provided to the mesh decoder (1150). The mesh decoder (1150) includes video decoders (1160), an auxiliary data decoder (1170), and a mesh reconstruction module (1190) coupled together as shown in FIG. 11. In an example, the video decoders (1160) correspond the video encoders (1130), and can decode a portion of the bitstream (1145) that is encoded by the video encoder (1130) and generate decoded maps (1165). In some examples, the decoded maps (1165) include a decoded UV map, one or more decoded attribute maps, and the like. In some examples, the decoded maps (1165) include a decoded occupancy map (e.g., initial decoded maps).

In the FIG. 11 example, the auxiliary data decoder (1170) corresponds the auxiliary data encoder (1140), and can decode a portion of the bitstream (1145) that is encoded by the auxiliary data encoder (1140) and generate decoded auxiliary data (1175).

In the FIG. 11 example, the decoded maps (1165) and the decoded auxiliary data (1175) are provided to mesh reconstruction module (1190). The mesh reconstruction module (1190) generates the reconstructed mesh (1195) based on the decoded maps (1165) and the decoded auxiliary data (1175). In some examples, the mesh reconstruction module (1190) can determine vertices and information of the vertices in the reconstructed mesh (1195), such as respective 3D coordinates, UV coordinates, color, and the like associated with the vertices. The operations of the auxiliary data decoder (1170) and the mesh reconstruction module (1190) will be further described in the present disclosure.

It is noted that components in the mesh encoder (1110), such as the pre-processing module (1111), the adaptive sampling module (1120), the video encoders (1130) and the auxiliary data encoder (1140) can be respectively implemented by various techniques. In an example, a component is implemented by integrated circuitry. In another example, a component is implemented using software that can be executed by one or more processors.

It is noted that components in the mesh decoder (1150), such as the video decoders (1160), the auxiliary data decoder (1170), and the mesh reconstruction module (1190), can be respectively implemented by various techniques. In an example, a component is implemented by integrated circuitry. In another example, a component is implemented using software that can be executed by one or more processors.

In some embodiments, the sampling adaptation can be based on map type. In some examples, the adaptive sampling module (1120) can apply different sampling rates to different types of maps. For example, different sampling rates can be applied to a geometry map and an attribute map. In an example, a mesh is a model for an object with a regular shape and abundance texture. For example, the object has a rectangular shape, but abundance colors. Thus, the information density of the geometry map is relatively low. In an example, the adaptive sampling module (1120) applies a first sampling rate of 2:1 on the geometry map (in both vertical direction and horizontal direction) and applies a second sampling rate of 1:1 on the texture map (in both vertical direction and horizontal direction).

In some examples, the sampling rate of A:B in a direction indicates to generate B samples from A pixels in the original map in the direction. For example, the sampling rate of 2:1 in the horizontal direction indicates to generate 1 sample for every two pixels in the original map in the horizontal direction. The sampling rate of 2:1 in the vertical direction indicates to generate 1 sample for every two pixels in the original map in the vertical direction.

In some examples, a term of sampling step is used. A sampling step in a direction indicates a number of pixels between two adjacent sampling positions in the direction. For example, a sampling step of two in the horizontal direction indicates to two pixels between adjacent sampling positions in the horizontal direction; and a sampling step of two in the vertical direction indicates to two pixels between adjacent sampling positions in the vertical direction. It is noted that, in the present disclosure, the sampling rate is equivalent to the sampling step. For example, a sampling rate of 2 (e.g., 2:1) is equivalent to two pixels between adjacent sampling position.

In some embodiments, the sampling adaptation is based on sub-regions in a map. Different sampling rates can be applied on different portions of the map. In some examples, some rows of pixels have less information to be preserved, then larger sampling rates can be applied along these rows, resulting a smaller number of sample rows to be coded. In some examples, some columns of pixels have less information to be preserved, then larger sampling rates can be applied along these columns, resulting a smaller number of sample columns to be coded. For other regions, smaller sampling rates are applied to keep the loss of information minimum after the sampling.

Figure 12:
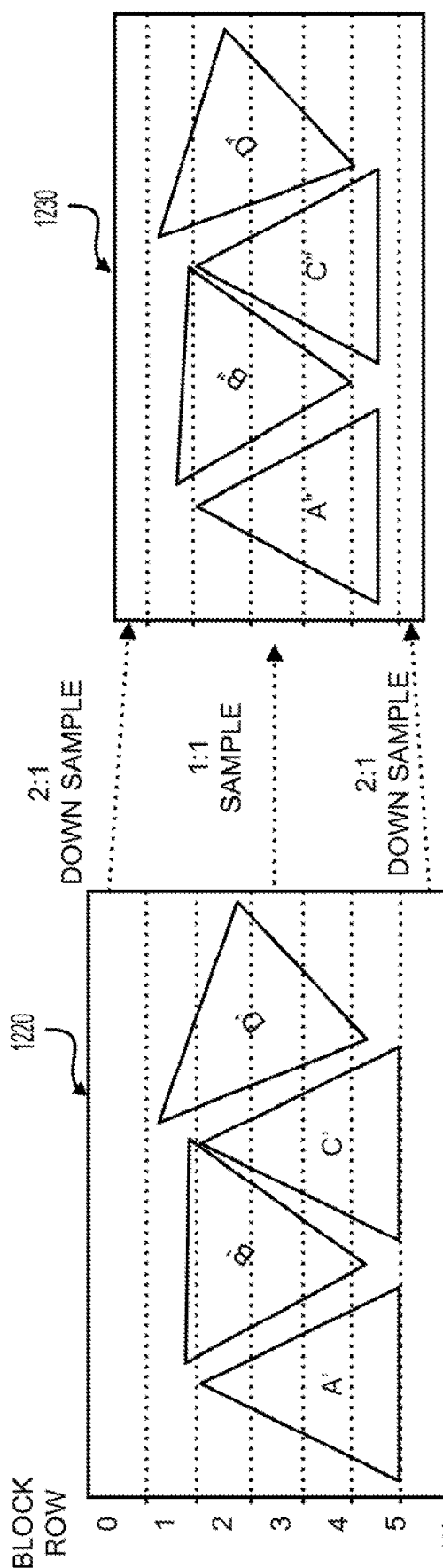
FIG. 12 shows a diagram of adaptive sampling in some examples.

FIG. 12 shows a diagram of adaptive sampling in some examples. A map (1220) is divided into several block rows, each block row includes a fixed number of sample (pixel) rows. Different sampling rates are applied to the block rows in the vertical direction to generate an adaptively sampled map (1230). For example, each block row is a CTU row (also referred to as CTU line) and includes 64 rows of samples (also referred to as pixels). In the FIG. 12 example, for block row 0 and block row 6 in the map (1220), a first sampling rate of 2:1 is applied in the vertical direction, and resulting 32 rows of samples for each of block row 0 and block row 6 in the adaptively sampled map (1230) after sampling. For block rows 1 to 5 in the map (1220), a second sampling rate of 1:1 is applied in the vertical direction, resulting 64 of rows of samples for each of block rows 1 to 5 in the adaptively sampled map (1230).

It is noted that a sampling rate of 1:1 is applied to the horizontal direction in FIG. 12.

In some examples, the adaptively sampled map (1230) is then encoded by an image or video encoder, such as the video encoders (1130). At the decoder side, in an example, the adaptively sampled map (1230) is decoded. After decoding, the top 32 rows of samples are recovered (up-sampled) to an original resolution, such as 64 rows of samples; and the bottom 32 rows of samples are recovered (up-sampled) to an original resolution, such as 64 rows of samples.

In some other examples, a to-be-coded map in a 2D representation of a 3D mesh can be divided into a number of sub-regions. Examples of such division inside a map (e.g., a picture) include slice, tile, tile group, coding tree unit, and the like. In some examples, different sampling rates can be applied to different sub-regions. In an example, the different sampling rates associated with the different sub-regions can be signaled in a bitstream that carries the 3D mesh. At the decoder side, after decoding of the adaptively sampled map, each sub region is recovered to its original resolution according to a sampling rate associated with the sub region.

In some examples, the recovering process of the adaptively sampled map to the original resolution is referred to as an inverse sampling process that generates a recovered map. After the recovery from the inverse sampling process, the output of the recovered map in the form of a 2D atlas can be used for 3D mesh reconstruction.

While the example in FIG. 12 shows adaptive sampling to different block rows in the vertical direction, similar adaptive sampling can be applied to different columns in the horizontal direction, or can be applied in both vertical direction and horizontal direction.

In some embodiments, sampling adaptation is based on patches. In some examples, different patches in a map can have different sampling rates.

Figure 13:
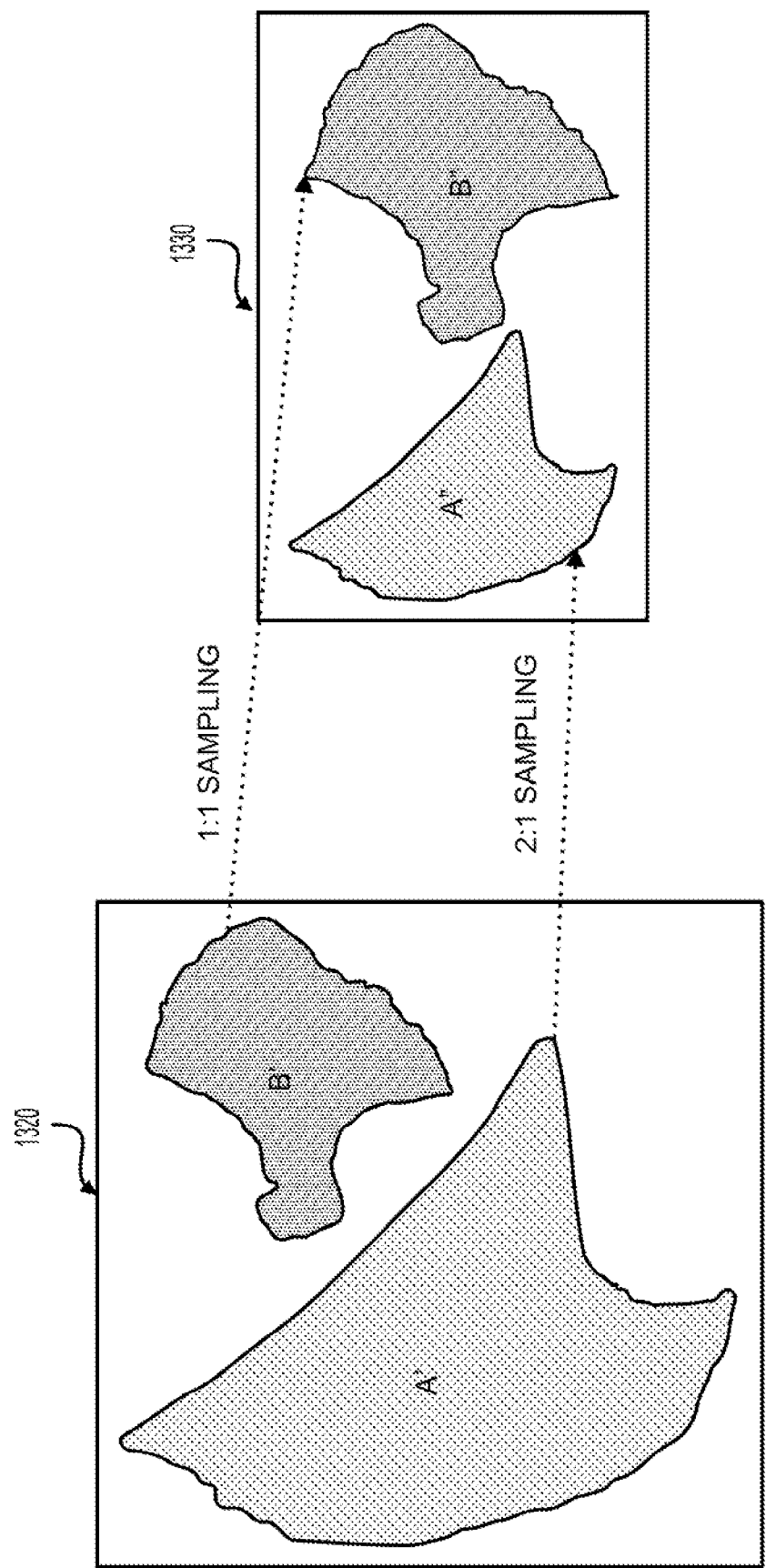
FIG. 13 shows a diagram of adaptive sampling in some examples.

FIG. 13 shows a diagram of adaptive sampling in some examples. A map (1320), such as a 2D atlas with high resolution, includes multiple 2D shapes that are also referred to as UV patches corresponding to patches in 3D mesh, such as a first 2D shape A' and a second 2D shape B'. In the FIG. 13 example, a first sampling rate of 2:1 is applied to the first 2D shape A' in both vertical direction and horizontal direction to generate a first sampled 2D shape A"; and a second sampling rate of 1:1 is applied to the second 2D shape B' in both vertical direction and horizontal direction to generate a second sampled 2D shape B". The first sampled 2D shape A" and the second sampled 2D shape B" are placed in a new map that is referred to as an adaptively sampled map (1330).

In the FIG. 13 example, the first sampled 2D shape A" is smaller than the first 2D shape A', and the second sampled 2D shape B" is of the same size as the second 2D shape B'. The adaptively sampled map (1330) is encoded by an image or video encoder, such as the video encoders (1130), into a bitstream that carries the 3D mesh. In some examples, sampling rates associated with the sampled 2D shapes are encoded, for example by the auxiliary data encoder (1140), into the bitstream that carries the 3D mesh.

In some examples, at a decoder side, an image/video decoder, such as the video decoders (1160), decodes an initial map, such as the adaptively sampled map (1330) from the bitstream. Further, sampling rates associated with sampled 2D shapes are decoded from the bitstream, for example by the auxiliary data decoder (1170). According to the sampling rates associated with the sampled 2D shapes, the sampled 2D shapes in the adaptively sampled map (1330) are recovered to original sizes (e.g., same number of pixels in the vertical direction and horizontal direction) to generate recovered map. The recovered map is then used for 3D mesh reconstruction.

According to an aspect of the disclosure, the adaptive sampling information, such as the sampling rates for different map types, the sampling rates for different sub-regions, the sampling rates for different patches, and the like is known at the mesh encoder side and the mesh decoder side. In some examples, the adaptive sampling information is suitable encoded into the bitstream that carries the 3D mesh. Thus, the mesh decoder and the mesh encoder can operate based on the same adaptive sampling information. The mesh decoder can recover the maps to the correct sizes.

According to an aspect of the disclosure, reordering based coding techniques also generate 2D maps from a 3D mesh.

Figure 14C:
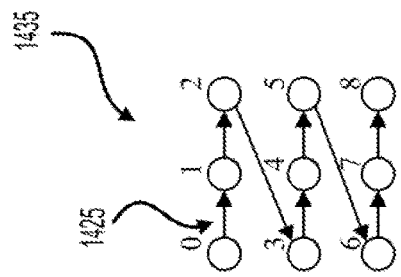
FIGS. 14A-14E show an example of using vertex reordering for mesh compression in some examples.
Figure 14B:
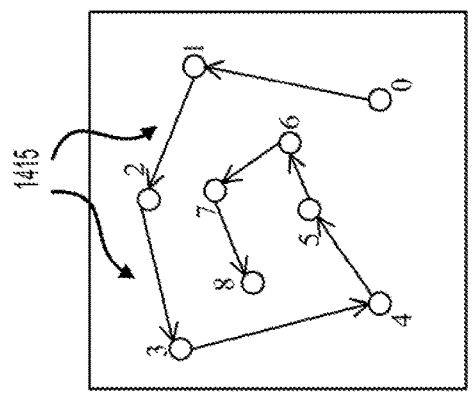
Figure 14A:
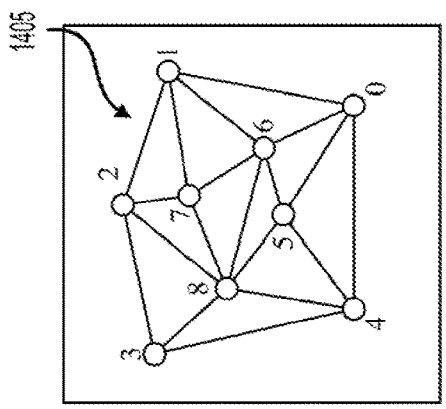

FIGS. 14A-14E show an example of using vertex reordering for mesh compression. FIG. 14A shows a diagram of an input mesh (1405) (e.g., original mesh). The input mesh (1405) includes connected triangles that describe a surface of an object. Each triangle is defined by vertices and edges that connect the vertices into the triangle. The input mesh (1405) includes vertices 0 to 8 that are connected into triangles as shown in FIG. 14A.

FIG. 14B shows a diagram of a vertex traversal order (1415) in some examples. The vertex traversal order (1415) is shown by lines with arrows and travers the vertex 0, the vertex 1, the vertex 2, the vertex 3, the vertex 4, the vertex 5, the vertex 6, the vertex 7 and the vertex 8 in a sequence.

Then, the attributes of the vertices, such as the 3D (geometry) coordinates of the vertices, UV coordinates of the vertices, and other attributes of the vertices can be reordered into arrays according to the vertex traversal order (1415). For example, the 3D coordinates of the vertices can be reordered into an array of 3D coordinates in the vertex traversal order (1415), the UV coordinates of the vertices can be reordered into an array of UV coordinates in the vertex traversal order (1415). The arrays can be 1D arrays or can be 2D arrays.

In some examples, the attributes of the vertices are re-ordered and re-shaped according to a raster scan line into a 2D array that form a 2D image. The 2D image can be coded by predictive coding techniques, such as by image or video codec. In an example of a dynamic mesh that includes a sequence of mesh frames, the attributes of the dynamic mesh can be re-ordered to form a sequence of 2D images, and the sequence of 2D images can be coded by a video codec in an example.

FIG. 14C shows a diagram illustrating a raster scan line (1425) that is used to reshape attributes of the vertices into a 2D array (1435). The raster scan line (1425) is shown by lines with arrows. The 2D array (1435) can be also referred to as 2D map or 2D image. In an example, an attribute for a vertex is stored at an entry in the 2D array (1435) corresponding to the vertex, the entry is a pixel in the 2D image, and the attribute value can be considered as the color information of the pixel. In an example, the 2D array (1435) can be a 3D coordinates map. In another example, the 2D array (1435) can be UV coordinate map. The 2D array (1435) can be encoded into a bitstream for carrying the mesh frame.

In some examples, the connectivity information (e.g., how to connect the vertices into edges of triangles) is not explicitly encoded into a bitstream for carrying the mesh frame. Thus, at a decoder side, the decoder can decode the attributes (e.g., 3D coordinates, uv coordinates, and the like) of the vertices from, for example 2D maps, and reconstruct the vertices.

Figure 14E:
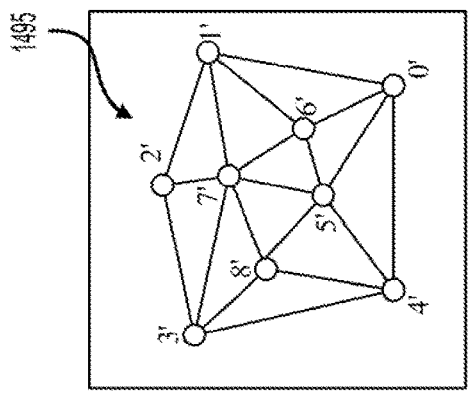
Figure 14D:
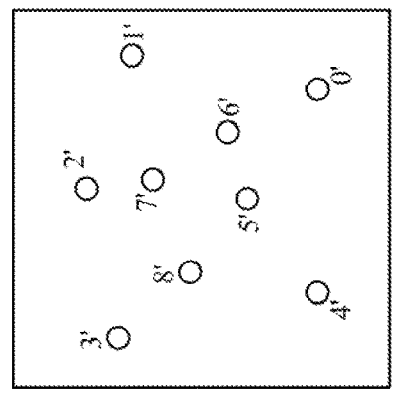

FIG. 14D shows a diagram illustrating reconstructed vertices 0'-8' in some examples. For example, coordinates (e.g., 3D coordinates, uv coordinates) can be decoded from the bitstream, and then the reconstructed vertices 0'-8' can be generated according to the decoded coordinates.

In some examples, the connectivity information is not explicitly encoded into the bitstream, and edges to connect the reconstructed vertices 0'-8' are inferred according to a connectivity infer rule. The connectivity infer rule can infer connectivity from the decoded 3D coordinates (xyz coordinates) and/or UV coordinates (uv coordinates) on the decoder side. In an example, the connectivity infer rule is suitably established at the decoder side. Once all the vertices are decoded, neighboring vertices are connected according to the connectivity infer rule. The decoder does not need to decode connectivity information from the bitstream.

FIG. 14E shows a diagram illustrating inferred connectivity information (edges) that can connect the reconstructed vertices 0'-8' into triangles to form a reconstructed mesh (1495).

As shown by FIG. 14A and FIG. 14E, the connectivity (edges) of vertices in the reconstructed mesh (1495) can be different from the original input mesh (1405). The connectivity differences can cause the subjective quality of the reconstructed mesh to suffer in some examples. According to another aspect of the disclosure, inferring connectivity at decoder side can take time and consume computation power in terms of complexity.

Aspects of the disclosure provide techniques to explicitly code the connectivity information of a mesh frame in a bitstream that carries the mesh frame. In some examples, connectivity information is provided in the form of polygon faces. Each polygon face is defined by a sequence of vertices that are connected to form edges of the polygon face. In an example, the connectivity information is provided in the form of triangles (also referred to as triangle faces), each triangle is defined by three vertices that are connected to form three edges of the triangle. For example, the mesh connectivity for the input mesh (1405) can include a triangle formed by the vertex 0, the vertex 1 and the vertex 6 in the form of "f v0 v1 v6", where "f" indicates face information, "v0" is an index for the vertex 0, "v1" is an index for the vertex 1, and "v6" is an index for the vertex 6.

According to an aspect of the disclosure, the connectivity information of the mesh frame can be reorganized as respective connectivity attributes of vertices.

According to an aspect of the disclosure, the connectivity attribute of a vertex can be any suitable metric that represents the connectivity information at the vertex. In an example, the connectivity attribute of a vertex includes a valence value that is the number of edges at the vertex. For example, the valence value of vertex 3 in the input mesh (1405) is 3, and the valence value of vertex 5 in the input mesh (1405) is 4, the valence value of vertex 8 in the input mesh (1405) is 6, and so on.

In another example, an algorithm that is referred to as Edgebreaker algorithm can traverse vertices, and mark each vertex with a pattern index to describe how the vertex can connect to some other vertices. For example, the pattern index can identify a connectivity pattern, such as an interior vertex, a boundary vertex, and other patterns. Then, the connectivity attribute of a vertex can include the pattern index marked by the Edgebreaker algorithm.

In some examples, the connectivity attributes of vertices can be reordered and reshaped as other attributes of the vertices, and then can be explicitly coded into the bitstream that carry the mesh.

Figure 15:
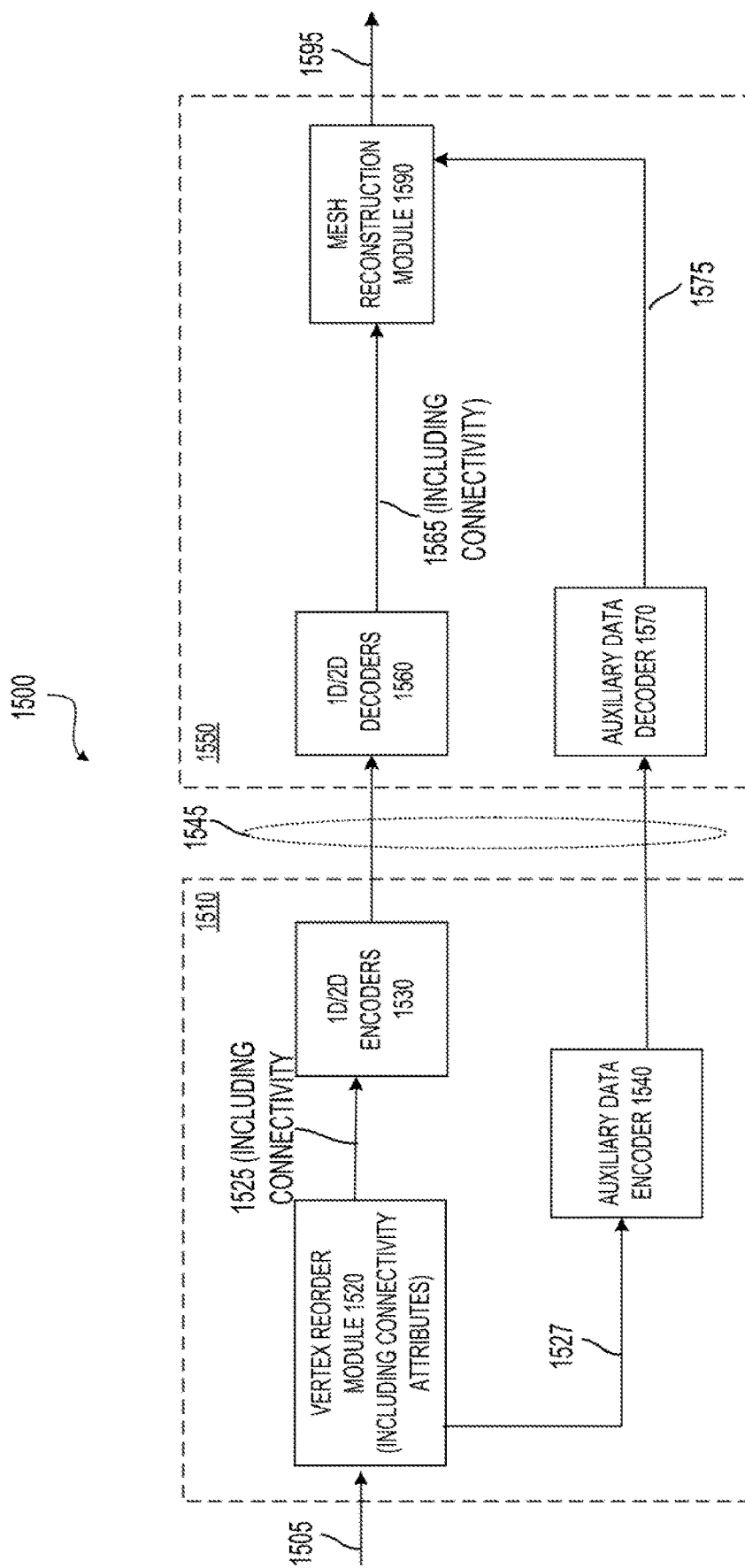
FIG. 15 shows a diagram of a framework for mesh compression in some examples.

FIG. 15 shows a diagram of a framework (1500) for mesh compression according to some embodiments of the disclosure. The framework (1500) includes a mesh encoder (1510) and a mesh decoder (1550). The mesh encoder (1510) encodes an input mesh (1505) (a mesh frame in case of a dynamic mesh processing) into a bitstream (1545), and the mesh decoder (1550) decodes the bitstream (1545) to generate a reconstructed mesh (1595) (a reconstructed mesh frame in case of a dynamic mesh processing).

The mesh encoder (1510) can be any suitable device, such as a computer, a server computer, a desktop computer, a laptop computer, a tablet computer, a smart phone, a gaming device, an AR device, a VR device, and the like. The mesh decoder (1550) can be any suitable device, such as a computer, a client computer, a desktop computer, a laptop computer, a tablet computer, a smart phone, a gaming device, an AR device, a VR device, and the like. The bitstream (1545) can be transmitted from the mesh encoder (1510) to the mesh decoder (1550) via any suitable communication network (not shown).

In the FIG. 15 example, the mesh encoder (1510) includes a vertex reorder module (1520), 1D/2D encoders (1530), and an auxiliary data encoder (1540) coupled together. The vertex reorder module (1520) receives the input mesh (1505) and performs reordering to generate mesh information of reordered vertices (1525). In some examples, the input mesh (1505) includes 3D location information of vertices of a mesh in an original order, connectivity information in the form of polygon faces, mapping information that parameterizes the mesh to 2D (e.g., UV atlas), and other 2D attribute maps (e.g., 2D color map). The vertex reorder module (1520) can determine a vertex traversal order of the vertices, and reorder and/or rearrange the vertices according to the vertex traversal order to increase attribute correlations of neighboring vertices (e.g., attribute correlation of neighboring vertices a sequence (e.g., 1D array), attribute correlations of neighboring vertices in local regions in 2D array, attribute correlation of neighboring frames).

In an example, the vertex reorder module (1520) can reorganize the connectivity information of the mesh frame in the form of respective connectivity attributes (also referred to as original connectivity attributes) of vertices. In an example, the connectivity attribute of each vertex can include a pattern index for indicating a connectivity pattern marked by Edgebreaker algorithm for connectivity compression. In another example, the connectivity attribute of each vertex can include a valence value that indicates the number of edges connected to the vertex.

The vertex reorder module (1520) outputs the mesh information of reordered vertices (1525). The mesh information of reordered vertices (1525) includes vertex information of vertices in the reordered sequence (e.g., 1D). For example, vertex information for each vertex can include various attributes, such as 3D spatial information in the mesh (e.g., xyz coordinates), mapping information to 2D (e.g., uv coordinates), color information (e.g., RGB values), and connectivity attribute.

In another example, the mesh information of reordered vertices (1525) includes vertex information of vertices in the form of 2D images. For example, the reordered vertices are rearranged into samples (pixels) of 2D (e.g., based on raster scan line, and the like), and the mesh information of the reordered vertices can form one or more 2D images, such as a 2D image of 3D coordinates of vertices, a 2D image of UV coordinates of vertices, a 2D image of vertex connectivity attribute, and the like.

The 1D/2D encoders (1530) are configured to encode the mesh information of reordered vertices (1525) into the bitstream (1545). When the mesh information of reordered vertices (1525) includes the vertex information of vertices in the reordered sequence (1D), the 1D/2D encoders (1530) can encode the vertex information of vertices in the reordered sequence using 1D encoding techniques. When the mesh information of reordered vertices (1525) includes 2D images, the 1D/2D encoders (1530) can encode the 2D images using image encoding and/or video encoding techniques (e.g., using image codec or video codec).

The vertex reorder module (1520) also generates auxiliary data (1527) that includes assistance information. The auxiliary data encoder (1540) receives the auxiliary data (1527), and encodes the auxiliary data (1527) into the bitstream (1545). For example, the vertex reorder module (1520) can reorder the vertices patch by patch. The vertex reorder module (1520) can provide values indicating the number of vertices in each patch in the auxiliary data (1527). Further, in an example, the vertex reorder module (1520) can reorder, for each patch, boundary vertices in front of non-boundary vertices. The vertex reorder module (1520) can provide values indicating the number of boundary vertices in each patch in the auxiliary data (1527). In another example, the vertex reorder module (1520) can traverse the vertices according to the Edgebreaker algorithm, and can provide a signal indicative of the Edgebreaker algorithm in the auxiliary data (1527).

In the FIG. 15 example, the bitstream (1545) is provided to the mesh decoder (1550). The mesh decoder (1550) includes 1D/2D decoders (1560), an auxiliary data decoder (1570), and a mesh reconstruction module (1590) coupled together as shown in FIG. 15. In an example, the 1D/2D decoders (1560) correspond the 1D/2D encoders (1530), and can decode a portion of the bitstream (1545) that is encoded by the 1D/2D encoder (1530) and generate decoded information (1565). In an example, the decoded information (1565) includes decoded connectivity attribute map, and other decoded attribute maps, such as decoded 3D coordinate map, decoded uv coordinate map, color map, and the like.

In the FIG. 15 example, the auxiliary data decoder (1570) corresponds to the auxiliary data encoder (1540), and can decode a portion of the bitstream (1545) that is encoded by the auxiliary data encoder (1540) and generate decoded auxiliary data (1575).

In the FIG. 15 example, the decoded information (1565), the decoded auxiliary data (1575) are provided to the mesh reconstruction module (1590). The mesh reconstruction module (1590) generates the reconstructed mesh (1595) based on the decoded information (1565), the decoded auxiliary data (1575).

It is noted that components in the mesh encoder (1510), such as the vertex reorder module (1520), the auxiliary data encoder (1540) and the 1D/2D encoders (1530) can be respectively implemented by various techniques. In an example, a component is implemented by integrated circuitry. In another example, a component is implemented using software that can be executed by one or more processors.

It is noted that components in the mesh decoder (1550), such as the 1D/2D decoders (1560), the auxiliary data decoder (1570), and the mesh reconstruction module (1590), can be respectively implemented by various techniques. In an example, a component is implemented by integrated circuitry. In another example, a component is implemented using software that can be executed by one or more processors.

Figure 16A:
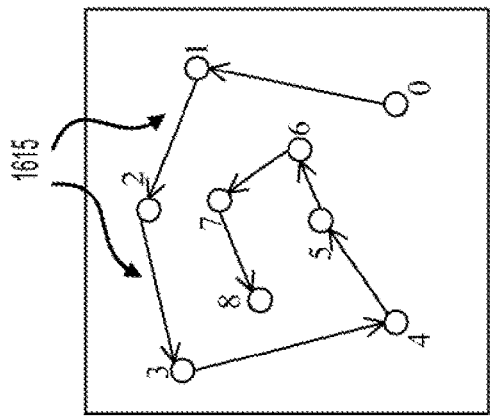
FIGS. 16A-16D show an example of coding connectivity attributes of a mesh frame in some examples.

FIGS. 16A-16D show an example of explicitly coding connectivity attributes of a mesh frame in a bitstream that carries the mesh frame according to some embodiments of the disclosure. FIG. 16A shows a diagram of an input mesh (1605). The input mesh (1605) includes connected triangles that describe a surface of an object. Each triangle is defined by vertices and edges that connect the vertices into the triangle. The input mesh (1605) includes vertices 0 to 8 that are connected into triangles as shown in FIG. 16A.

Figure 16B:
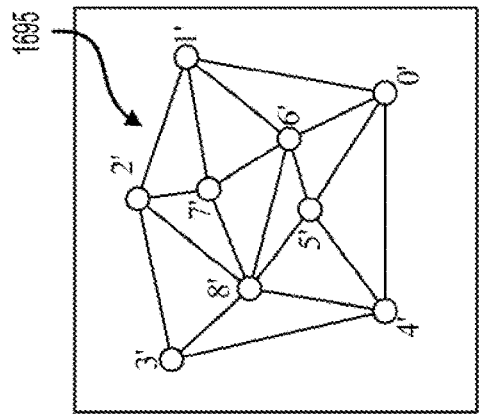

FIG. 16B shows a diagram of a vertex traversal order (1615). The vertex traversal order (1615) is shown by lines with arrows that traverse the vertex 0, the vertex 1, the vertex 2, the vertex 3, the vertex 4, the vertex 5, the vertex 6, the vertex 7 and the vertex 8 in a sequence.

Then, the attributes of the vertices, such as the 3D (geometry) coordinates of the vertices, UV coordinates of the vertices, connectivity attributes of the vertices, and other attributes of the vertices can be reordered into arrays according to the vertex traversal order (1615). For example, the 3D coordinates of the vertices can be reordered into an array of 3D coordinates in the vertex traversal order (1615), the UV coordinates of the vertices can be reordered into an array of UV coordinates in the vertex traversal order (1615), the connectivity attributes of the vertices can be reordered into an array of connectivity attributes in the vertex traversal order (1615). The arrays can be 1D arrays or can be 2D arrays.

In some examples, the attributes of the vertices are re-ordered and re-shaped according to a raster scan line into a 2D array that form a 2D image. The 2D image can be coded by predictive coding techniques, such as by image or video codec. In an example of a dynamic mesh that includes a sequence of mesh frames, the attributes of the dynamic mesh can be re-ordered to form a sequence of 2D images, and the sequence of 2D images can be coded by a video codec in an example.

Figure 16C:
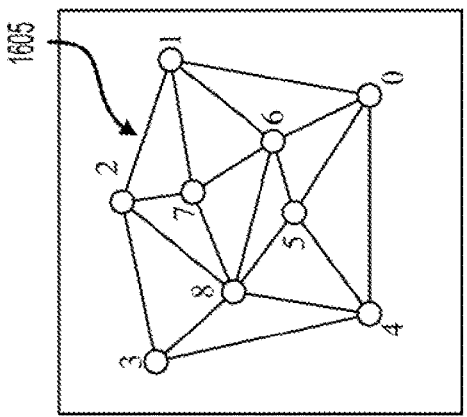

FIG. 16C shows a diagram illustrating a raster scan line (1625) that is used to reshape attributes of the vertices into 2D arrays, such as a 2D array (1645) and a 2D array (1635). The raster scan line (1625) is shown by lines with arrows. The 2D arrays (1635) and (1645) can be also referred to as 2D maps or 2D images. In an example, a connectivity attribute for a vertex is stored at an entry in the 2D array (1645) corresponding to the vertex, the entry is a pixel in the 2D image, and the connectivity attribute is the color information of the pixel. In an example, another attribute, such as 3D coordinates, UV coordinates, and the like for a vertex is stored at an entry in the 2D array (1635) corresponding to the vertex, the entry is a pixel in the 2D image, and the attribute is the color information of the pixel. In an example, the 2D array (1635) can be a 3D coordinates map. In another example, the 2D array (1635) can be UV coordinate map. The 2D array (1635) and the 2D array (1645) can be encoded into a bitstream for carrying the mesh frame.

It is noted that in the FIG. 16C example, the connectivity information (e.g., how to connect the vertices into edges of triangles) is reorganized in the form of connectivity attributes of the vertices, and the connectivity attributes of the vertices are explicitly encoded into a bitstream for carrying the mesh frame. In some examples, the vertices of the original mesh, such as the input mesh (1605) are traversed, and each vertex is marked with either a pattern index or a valence value that can represent the connectivity information of the vertex. For example, the EdgeBreaker algorithm can be used to determine a vertex traversal order, such as the vertex traversal order (1615), to traverse vertices and the EdgeBreaker algorithm can mark each vertex with a pattern index. The connectivity attributes of the vertices can be reordered according to the vertex traversal order, and then shaped into 2D map that is also referred to as a connectivity map denoted by $M_{org}$, such as the 2D array (1645). Each value at a pixel location in the connectivity map (e.g., the 2D array (1645)) is the corresponding pattern index or valence value of a vertex that is reordered and reshaped to the pixel location. Other attributes of the vertices can be reordered according to the vertex traversal order and then shaped into other 2D maps, such as the 2D array (1635). The connectivity map can be coded by any predictive coding methods, such as image codecs, video codecs, and the like. In some examples, the connectivity map can be coded in lossy mode. In some examples, the connectivity map can be coded in lossless mode.

According to an aspect of the disclosure, at a decoder side, the decoder can decode directly from the bitstream that carry the mesh frame, the connectivity attributes of the vertices with other attributes of the vertices. Then, the decoder can reconstruct the mesh frame according to the connectivity attributes of the vertices and other attributes of the vertices.

Figure 16D:
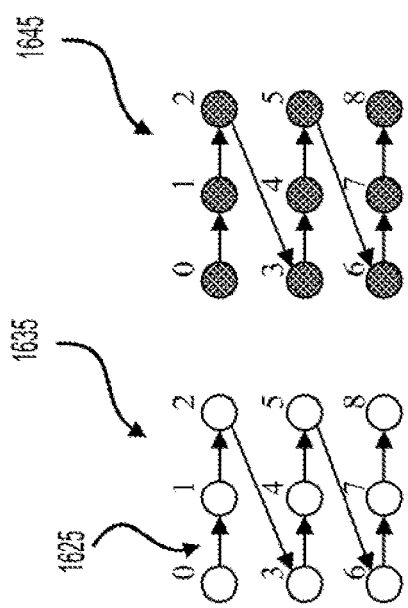

FIG. 16D shows a diagram illustrating a reconstructed mesh frame (1695). In an example, reconstructed vertices 0'-8' can be reconstructed from, for example, decoded coordinates of the vertices from the bitstream. Then, the reconstructed vertices 0'-8' can be connected according to the decoded connectivity attributes of the vertices from the bitstream, such as valences of the vertices or pattern indexes of the vertices. In an example, the Edgebreaker algorithm can be used to generate the reconstructed mesh frame (1695) according to the pattern indexes of the vertices. In another example, a suitable algorithm is used to generate the reconstructed mesh frame (1695) according to the valences of the vertices. The reconstructed mesh frame (1695) can have the same connectivity information (identical edges) as the original mesh frame (1605).

In some embodiments, the connectivity difference information of a mesh frame can be encoded in a bitstream that carries the mesh frame. The connectivity difference information is the difference between the original connectivity information in the input mesh frame and inferred connectivity information according to a connectivity infer rule.

Some aspects of the disclosure provide techniques for chart based mesh compression. The various coding techniques, such as such as direct coding techniques, sampling based coding techniques, reordering based coding techniques can be selected for different portions of a mesh to suite the characteristics of the different portions, thus an overall coding efficiency for the whole mesh (or mesh sequence) can be improved.

According to an aspect of the disclosure, UV parameterization can be used at an encoder side to map a 3D mesh to one or more 2D charts. In some examples, a 3D mesh can be partitioned into several segments (also referred to as patches in some examples). Each segment can include a set of connected vertices with associated geometry, attribute, and connectivity information.

Figure 17:
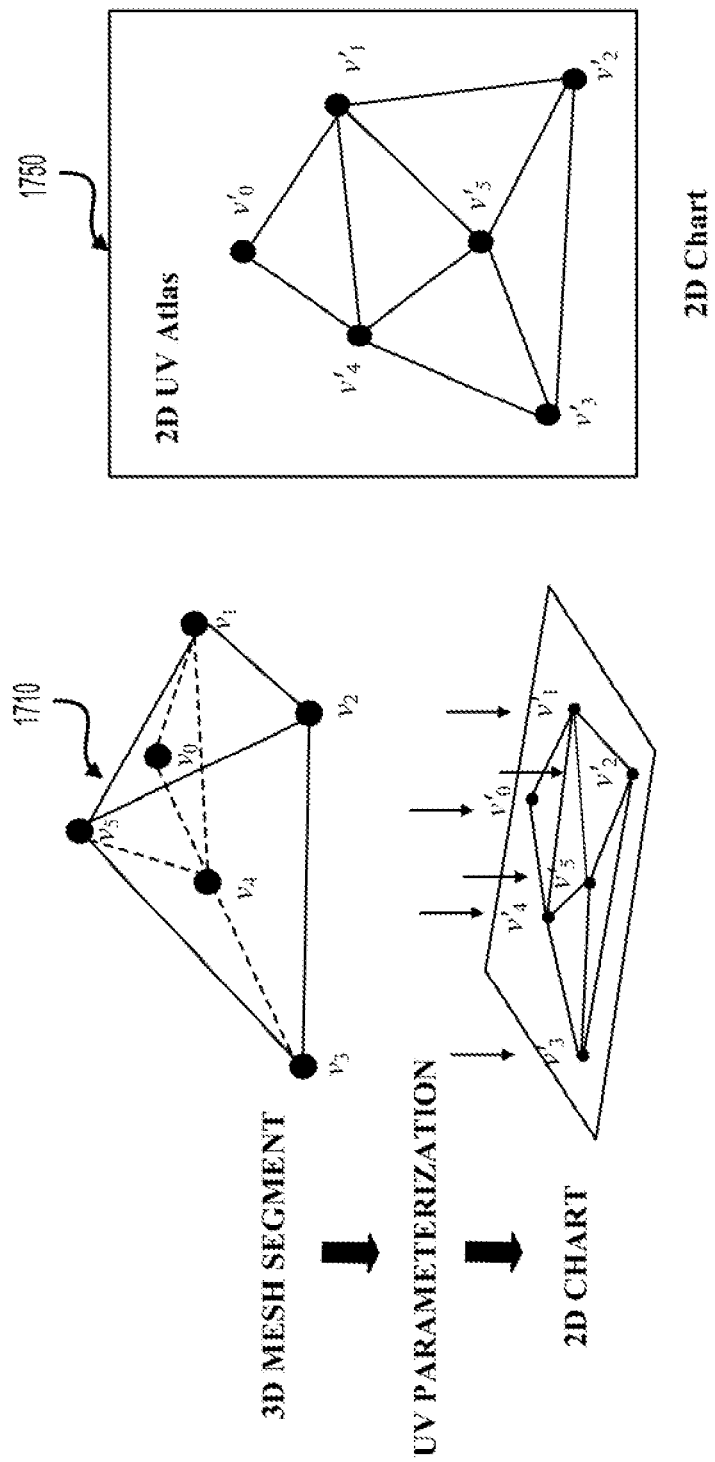
FIG. 17 shows a diagram of an UV parameterization process in an example.

FIG. 17 shows a diagram of an UV parameterization process that maps a mesh segment onto a 2D chart in a 2D UV atlas in some examples. In FIG. 17 example, a mesh segment (1710) is a segment of a 3D mesh. The mesh segment (1710) includes 6 vertices $v_0$-$v_5$. Each vertex in the mesh segment (1710) is assigned with 2D UV coordinates in a 2D UV atlas (1750), and is mapped to a 2D vertex in the 2D UV atlas (1750). For example, the vertex $v_0$ is mapped to a 2D vertex $v_0'$ in the 2D UV atlas (1750), the vertex $v_1$ is mapped to a 2D vertex $v_1'$ in the 2D UV atlas (1750), the vertex $v_2$ is mapped to a 2D vertex $v_2'$ in the 2D UV atlas (1750), the vertex $v_3$ is mapped to a 2D vertex $v_3'$ in the 2D UV atlas (1750), the vertex $v_4$ is mapped to a 2D vertex $v_4'$ in the 2D UV atlas (1750), and the vertex $v_5$ is mapped to a 2D vertex $v_5'$ in the 2D UV atlas (1750). The 2D vertices $v_0'$-$v_5'$ form a connected 2D chart corresponding to the 3D mesh segment. The geometry, attribute and connectivity information of the 2D vertices in the 2D chart can be inherited from the corresponding vertices in the 3D segment.

In some examples, a 3D mesh segment can be mapped to multiple separate 2D charts in a 2D UV atlas. A vertex in the 3D segment can correspond to multiple 2D vertices in the 2D UV atlas.

Figure 18:
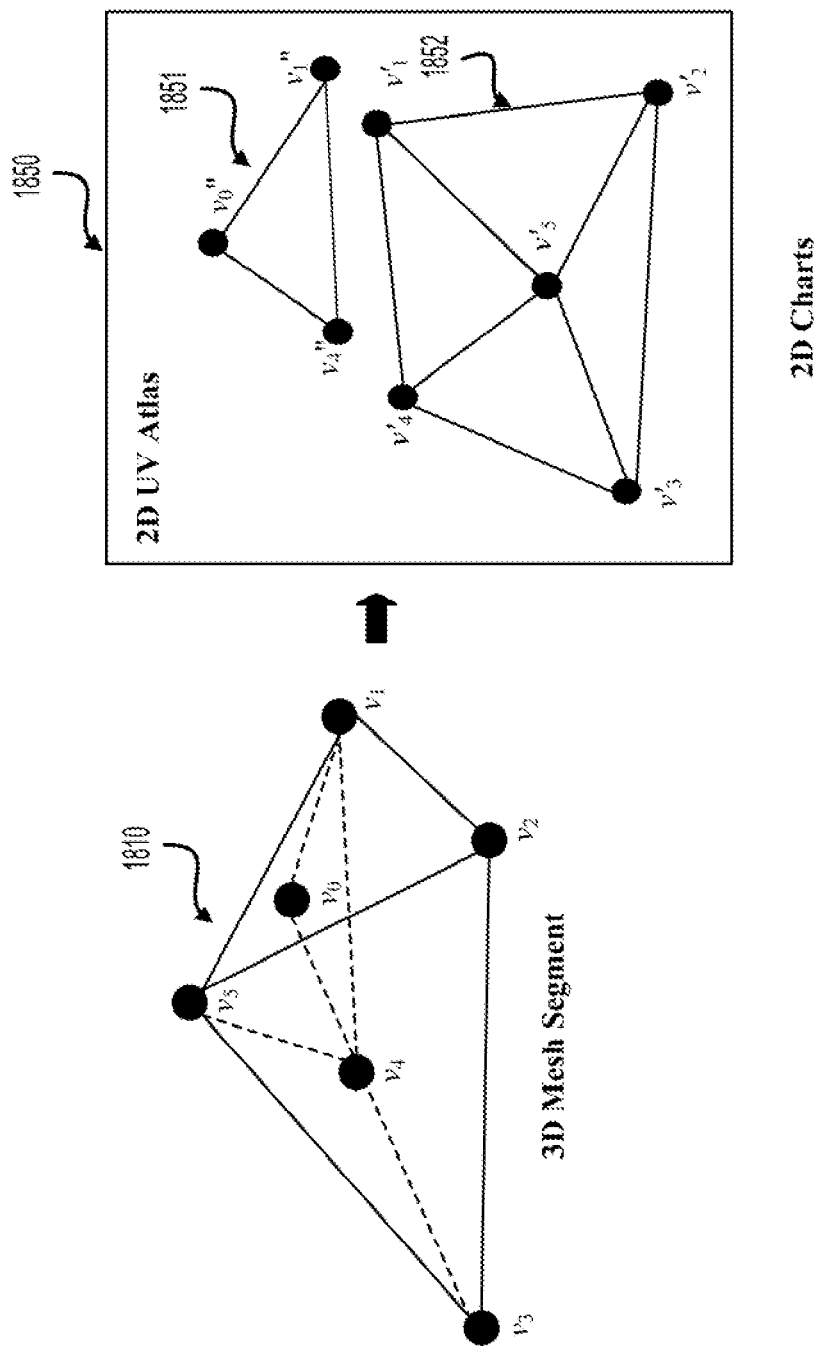
FIG. 18 shows another diagram of an UV parameterization process in an example.

FIG. 18 shows a diagram of an UV parameterization process that maps a mesh segment onto multiple 2D charts in a 2D UV atlas in some examples. In FIG. 18 example, a mesh segment (1810) is a segment of a 3D mesh and can be identical to the mesh segment (1710) in FIG. 17. The mesh segment (1810) includes 6 vertices $v_0$-$v_5$. The mesh segment (1810) is mapped to two 2D charts (1851) and (1852) in a 2D UV atlas (1850). Each vertex in the mesh segment (1810) can be mapped to one or two 2D vertices in the 2D UV atlas (1850). For example, the vertex $v_0$ is mapped to a 2D vertex $v_0''$ in the 2D UV atlas (1850), the vertex $v_1$ is mapped to two vertices, such as a 2D vertex $v_1'$ and a 2D vertex $v_1''$ in the 2D UV atlas (1850), the vertex $v_2$ is mapped to a 2D vertex $v_2'$ in the 2D UV atlas (1850), the vertex $v_3$ is mapped to a 2D vertex $v_3'$ in the 2D UV atlas (1850), the vertex $v_4$ is mapped to two 2D vertices, such as 2D vertex $v_4'$ and 2D vertex $v_4''$ in the 2D UV atlas (1850), and the vertex $v_5$ is mapped to a 2D vertex $v_5'$ in the 2D UV atlas (1850). The 2D vertices $v_0''$, $v_1''$ and $v_4''$ form the 2D chart (1851), and the 2D vertices $v_1'$-$v_5'$ form the 2D chart (1852).

According to an aspect of the disclosure, a 2D UV atlas for a 3D mesh may include multiple 2D charts, and each 2D chart may include multiple (usually more than or equal to 3) 2D vertices with associated 3D geometry, attribute, and connectivity information inherited from corresponding vertices in the 3D mesh.

Figure 19:
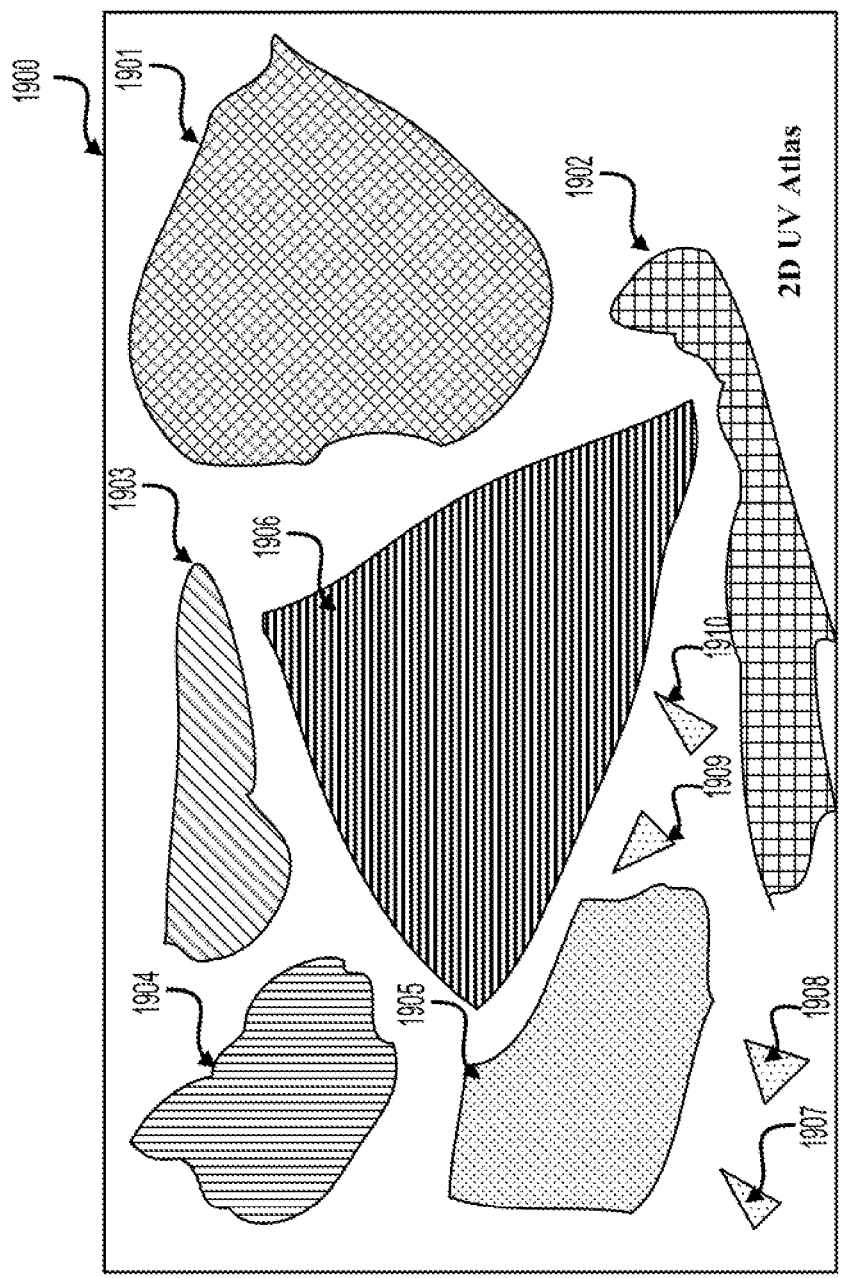
FIG. 19 shows a diagram of a 2D UV atlas in an example.

FIG. 19 shows a diagram of a 2D UV atlas (1900) in an example. The 2D UV atlas (1900) includes multiple 2D charts, such as 2D charts (1901)-(1910) as shown in FIG. 19.

Some aspects of the disclosure provide techniques for chart based mesh compression. The techniques can be used by mesh encoders and mesh decoders.

According to an aspect of the disclosure, each 2D chart in a 2D UV atlas can be coded (encoded and decoded) by various techniques, such as sampling based techniques, reordering based techniques, and chart based direct coding techniques (also referred to as raw chart coding techniques). For example, when a 2D chart is in a sampling based coding mode, the 2D chart is coded using the sampling based techniques; when a 2D chart is in a reordering based coding mode, the 2D chart is coded using the reordering based techniques; when a 2D chart is in a raw chart coding mode, the 2D chart is coded using the chart based direct coding techniques.

In the sampling based techniques, the 2D chart is sampled by a given sampling rate (step size) to generate 2D maps, such as geometry map, attribute map and occupancy map, and the like. The generated occupancy, geometry and attribute maps can be coded by video codecs. In some examples, the occupancy map is not generated at the encoder side. In an example, the boundary vertex information is coded in the bitstream, the occupancy map can be inferred at the decoder side according to the boundary vertex information.

In the reordering based techniques, the 2D vertices in the chart are arranged by a certain order, and filled in a 2D region by a certain space-filling curve (e.g., raster scan line) to generate 2D maps, such as UV map, geometry map, attribute map, connectivity map, and the like. The 2D maps can be coded by video codecs.

In some examples, a reordering based technique is applied to a first 2D chart of a 3D mesh to generate a first 2D map, and a sampling based technique is applied to a second 2D chart of the 3D mesh to generate a second 3D map. The first 2D map and the second 2D map can be merged into a combined 2D map. In an example, the position information of the first 2D map and the second 2D map in the combined 2D map is signaled in the bitstream. For example, the starting position (or boundary information or bounding-box) of the first 2D map for the first 2D chart and the starting position (or boundary information or bounding-box) of the second 2D map for the second 2D chart are signaled in the bitstream.

In the chart based direct coding techniques (also referred to as raw chart coding method), the geometry (UV coordinates and 3D coordinates), attribute, and connectivity information of the vertices in a 2D chart are directly coded in the bitstream, for example without using video codec. Predictive coding can be applied to reduce the data redundancy. For example, previously coded values can be used to predict the current value. The prediction can be from either the current mesh frame (e.g., intra frame spatial prediction) or previously coded mesh frames (e.g., inter frame temporal prediction). For example, the parallelogram prediction can be used to predict current geometry position from three previously coded geometry (UV coordinates and 3D coordinates) positions. The prediction residuals can be coded by arithmetic coding, and some context information from previous coded values can be used to improve the coding efficiency.

According to an aspect of the disclosure, the different chart based mesh compression coding techniques can be enabled and signaled at different levels in the bitstream.

In an embodiment, the entire mesh sequence uses a same chart based coding technique, for example, a sampling based technique. In some examples, an index indicative of a chart based coding mode can be signaled in the sequence header for the mesh sequence.

In another embodiment, each mesh frame may select a different chart based coding technique. Then, an index indicative of a chart based coding mode for a mesh frame can be signaled in a frame header of the mesh frame. Then, all the 2D charts parameterized from the mesh frame may use the same coding technique.

In another embodiment, each segment (e.g., a slice, a region) of a mesh frame may have an individually selected coding technique. In some examples, an index indicative of a selected chart based coding mode can be signaled in a header portion of the segment, such as a slice header of a slice (or a header for a region), and the like, thus all the charts in the slice (or in the region) may use the same specified coding technique indicated by the index.

In another embodiment, each 2D chart of a mesh frame may select an individual coding technique. In some examples, an index indicative of a selected chart based coding mode can be signaled for each 2D chart. In some examples, the index of the chart based coding mode can be predicted or can be coded by context coding in terms of the coded information, e.g., the index of the chart based coding mode of a previously coded 2D chart. In some embodiments, the index of the chart based coding mode can be also predicted or coded by contexts in terms of some characteristics of the current 2D chart, e.g., the number of vertices in the current 2D chart. For example, when the number of vertices in the current 2D chart is smaller than a threshold, the chart based coding mode for the current 2D chart can be predicted to be the raw chart coding mode.

According to an aspect of the disclosure, some common auxiliary information (e.g., the boundary vertex information) of the 2D charts can be coded in the bitstream regardless of the coding techniques. The auxiliary information can be used in mesh reconstruction at the decoder side.

Some aspects of the disclosure also provide techniques for the encoder side to select the coding techniques, for example, to select the chart based coding modes for 2D charts. In some examples, a mesh encoder can select a best chart based coding mode for each chart/region/frame/sequence, and can signal the selected chart based coding mode explicitly in the bitstream. When a chart based coding mode is selected for a region, 2D charts for the region are coded according to the chart based coding mode. When a chart based coding mode is selected for a (3D mesh) frame, 2D charts parameterized from the (3D mesh) frame are coded according to the chart based coding mode. When a chart based coding mode is selected for a sequence (of 3D mesh frames), 2D charts parameterized from the sequence (of 3D mesh frames) are coded according to the chart based coding mode.

In some embodiments, specific characteristics of the chart/region/frame/sequence can be used by the mesh encoder to determine/estimate the best chart based coding mode. In some examples, the mesh encoder can determine the chart based coding mode according to the number of vertices in the chart/region/frame/sequence. In some examples, the mesh encoder can determine the chart based coding mode according to the number of boundary vertices in the chart/region/frame/sequence. In some examples, the mesh encoder can determine the chart based coding mode according to the ratio between the number of boundary vertices and the number of vertices in the chart/region/frame/sequence. In some examples, the mesh encoder can determine the chart based coding mode according to the variation of the values (e.g., geometry, attribute) in the chart/region/frame/sequence. In some examples, the mesh encoder can determine the chart based coding mode according to temporal consistency (e.g., similarity from previous frames) in the chart/region of current frame.

In an example, the ratio between the number of boundary vertices and the number of vertices in the chart is used as the mode decision criterion. When the ratio of a 2D chart is larger than a threshold, the mesh encoder determines to use the raw chart coding mode for the 2D chart; otherwise, the mesh encoder determines to use the sampling based coding mode for the 2D chart.

In some embodiments, rate-distortion optimization (RDO) can be used to select the best chart based coding mode for the chart/region/frame/sequence. In some examples, the mesh encoder can calculate a rate-distortion cost for each chart based coding mode that is applied to the chart/region/frame/sequence. For example, for a chart based coding mode i, the mesh encoder calculates the rate-distortion cost $C_i$ by $C_i = D_i + \lambda \cdot R_i$, where $D_i$ indicates the distortion by the chart based coding mode i, and $R_i$ indicates the bitrate by the chart based coding mode i, and $\lambda$ is the trade-off factor between the distortion and the bitrate. Then, the best chart based coding mode is selected as the one that minimizes the rate-distortion cost, i.e., $$\underset{i}{\mathrm{argmin}} D_i + \lambda \cdot R_i.$$

It is noted that, in some examples, multiple-pass coding may be applied to calculate the real rate and distortion terms.

Figure 20:
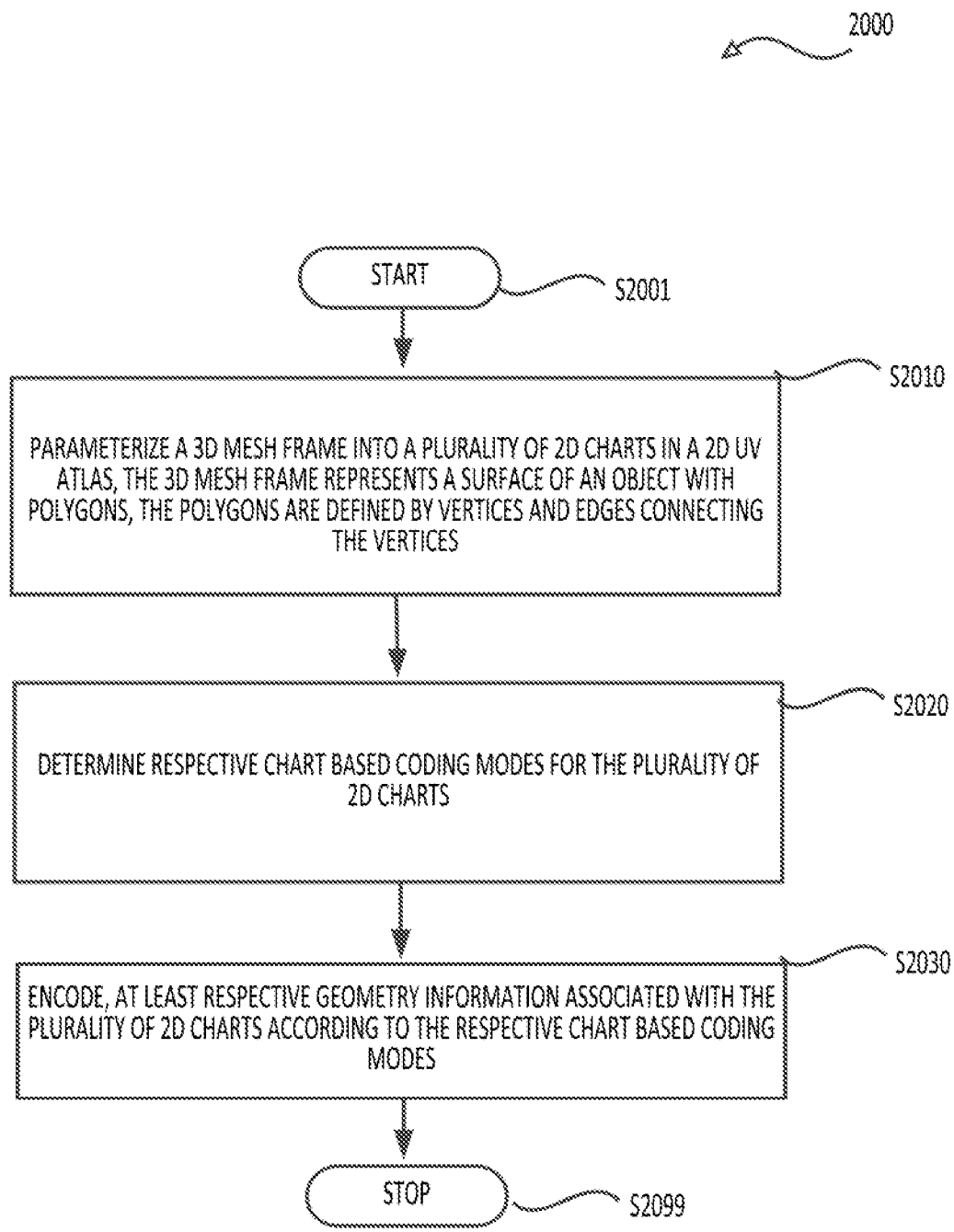
FIG. 20 shows a flow chart outlining a process example in some examples.

FIG. 20 shows a flow chart outlining a process (2000) according to an embodiment of the disclosure. The process (2000) can be used during an encoding process for a mesh. In various embodiments, the process (2000) is executed by processing circuitry. In some embodiments, the process (2000) is implemented in software instructions, thus when the processing circuitry executes the software instructions, the processing circuitry performs the process (2000). The process starts at (S2001) and proceeds to (S2010).

At (S2010), a 3D mesh frame is UV parameterized into a plurality of 2D charts in a 2D UV atlas. The 3D mesh frame represents a surface of an object with polygons, the polygons are defined by vertices and edges connecting the vertices. The vertices are mapped to 2D vertices in the 2D UV atlas, the 2D vertices form the plurality of 2D charts in the 2D UV atlas.

At (S2020), respective chart based coding modes are determined for the plurality of 2D charts.

At (S2030), at least respective geometry information associated with the plurality of 2D charts are encoded into a bitstream according to the respective chart based coding modes.

In some embodiments, the chart based coding modes include at least a sampling based coding mode, a reordering based coding mode and a raw chart coding mode.

In some examples, in response to a first 2D chart of the sampling based coding mode, the first 2D chart is sampled to generate at least a first geometry map that associates 3D coordinates of first vertices with UV coordinates of the first vertices in the first 2D chart. The first geometry map is encoded into the bitstream using an image encoder and/or a video encoder.

In some examples, in response to a second 2D chart of the reordering based coding mode, an order for reordering second vertices in the second 2D chart is determined. 3D coordinates of the second vertices are arranged into a second geometry map according to the order and a space filling curve. UV coordinates of the second vertices are arranged into an UV map according to the order and the space filling curve. Other attributes can be similarly arranged into 2D maps. The 2D maps, such as the second geometry map, the UV map, and the like are encoded into the bitstream using an image encoder and/or a video encoder.

In some examples, the sampling based coding mode is determined for a first 2D chart and the reordering based coding mode is determined for a second 2D chart. The first 2D chart is sampled to generate at least a first geometry map that associates 3D coordinates of first vertices in the first 2D chart with UV coordinates of the first vertices. An order for ordering second vertices in the second 2D chart is determined, and 3D coordinates of the second vertices are arranged into a second geometry map according to the order and a space filling curve. The first geometry map and the second geometry map are merged into a combined 2D geometry map without overlapping. The first geometry map is placed at a first position in the combined 2D geometry map. The second geometry map is placed at a second position of the combined 2D geometry map. The combined 2D geometry map is encoded into the bitstream using an image encoder and/or a video encoder. In an example, a first signal indicating the first position for the first 2D map in the combined 2D geometry map is encoded into the bitstream and a second signal indicating the second position for the second 2D map in the combined 2D geometry map is encoded into the bitstream.

In some examples, in response to a third 2D chart of the raw chart coding mode, UV coordinates and 3D coordinates of third vertices in the third 2D chart are encoded into the bitstream without using an image decoder or a video decoder.

In an example, an index is included into a sequence header for a sequence of 3D mesh frames including the 3D mesh frame. The index in the sequence header indicates a chart based coding mode for the plurality of 2D charts and other 2D charts parameterized from other 3D mesh frames in the sequence of 3D mesh frames.

In another example, an index is included into a frame header for the 3D mesh frame, the index in the frame header indicates a chart based coding mode respectively for the plurality of 2D charts parameterized from the 3D mesh frame.

In another example, an index is included into a first header of a first portion of the bitstream for carrying a first mesh segment of the 3D mesh frame, the first mesh segment is parameterized into first one or more 2D charts in the plurality of 2D charts, the index indicates a chart based coding mode respectively for the first one or more 2D charts.

In another example, respective indices are encoded to in association with the plurality of 2D charts. The respective indices indicate the respective chart based coding modes for the plurality of 2D charts.

In some examples, a chart based coding mode can be determined for one or more charts in a portion of a sequence of 3D mesh frames based on characteristics of the portion of sequence of 3D mesh frames. In an example, a chart based coding mode can be determined for a 2D chart based on characteristics of the 2D chart. In another example, a chart based coding mode can be determined for 2D charts in a region based on characteristics of the region. In another example, a chart based coding mode can be determined for 2D charts parameterized from a 3D mesh frame based on characteristics of the 3D mesh frame. In another example, a chart based coding mode can be determined for 2D charts parameterized from a sequence of 3D mesh frames based on characteristics of the sequence of 3D mesh frames. In an example, the characteristics include the number of vertices in the chart/region/frame/sequence. In another example, the characteristics include the number of boundary vertices in the chart/region/frame/sequence. In another example, the characteristics include the ratio between the number of boundary vertices and the number of vertices in the chart/region/frame/sequence. In another example, the characteristics include the variation of the values (e.g., geometry, attribute) in the chart/region/frame/sequence. In another example, the characteristics include temporal consistency (e.g., similarity from previous frames) in the chart/region of a current 3D mesh frame.

In some examples, a chart based coding mode can be determined for one or more charts in a portion (e.g., 2D chart, region, 3D mesh frame, the entire sequence) of a sequence of 3D mesh frames based on rate distortion optimization. A chart based coding mode can be selected from a set of chart based coding modes as the one with a minimum rate distortion cost.

Then, the process proceeds to (S2099) and terminates.

The process (2000) can be suitably adapted. Step(s) in the process (2000) can be modified and/or omitted. Additional step(s) can be added. Any suitable order of implementation can be used.

Figure 21:
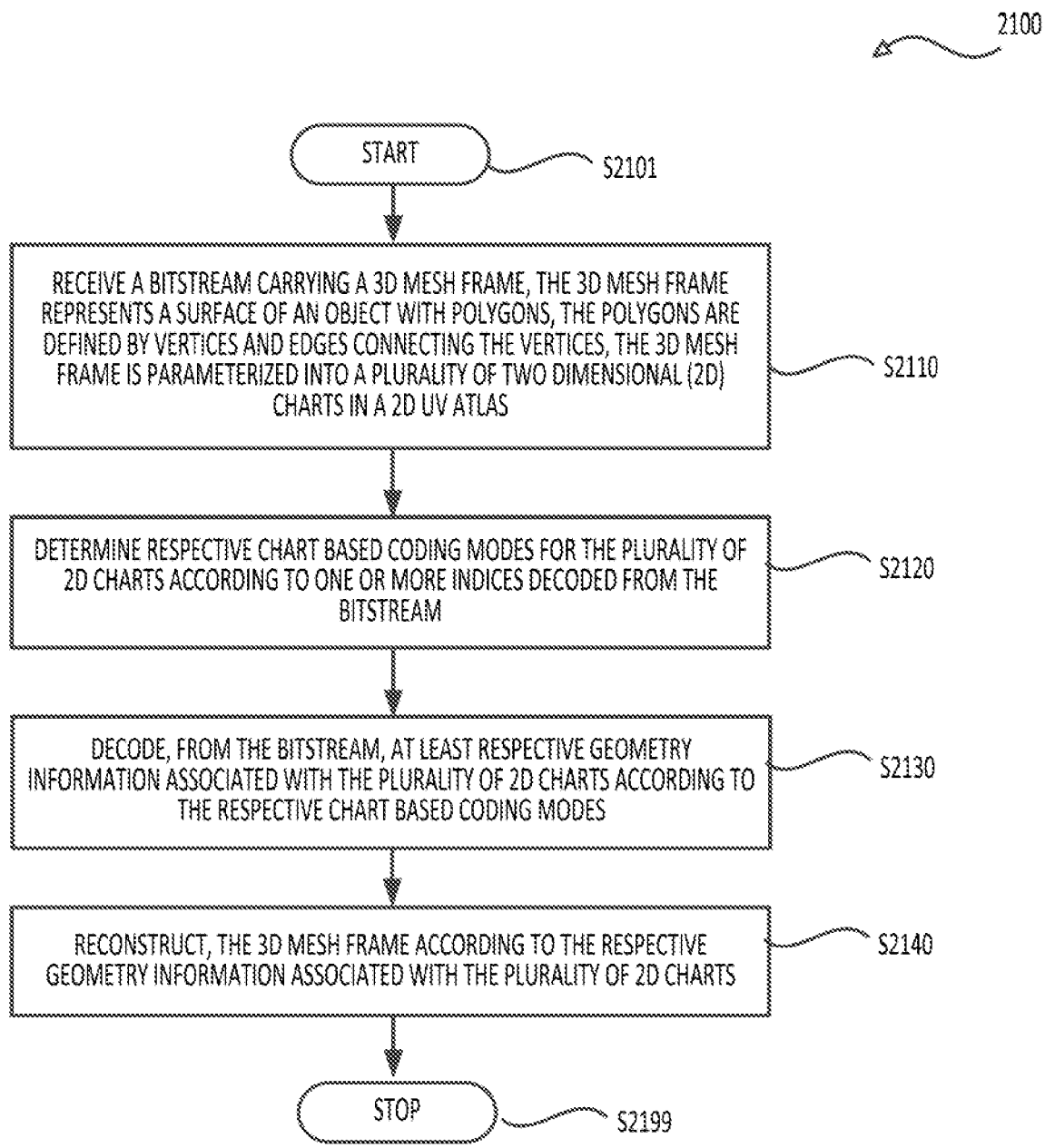
FIG. 21 shows a flow chart outlining a process example in some examples.

FIG. 21 shows a flow chart outlining a process (2100) according to an embodiment of the disclosure. The process (2100) can be used during a decoding process for a mesh. In various embodiments, the process (2100) is executed by processing circuitry. In some embodiments, the process (2100) is implemented in software instructions, thus when the processing circuitry executes the software instructions, the processing circuitry performs the process (2100). The process starts at (S2101) and proceeds to (S2110).

At (S2110), a bitstream carrying a 3D mesh frame is received. The 3D mesh frame represents a surface of an object with polygons, the polygons are defined by vertices and edges connecting the vertices. The 3D mesh frame is UV parameterized into a plurality of 2D charts in a 2D UV atlas. The vertices are mapped to 2D vertices in the 2D UV atlas, the 2D vertices form the plurality of 2D charts in the 2D UV atlas.

At (S2120), respective chart based coding modes for the plurality of 2D charts are determined according to one or more indices decoded from the bitstream.

At (S2130), at least respective geometry information associated with the plurality of 2D charts is decoded from the bitstream according to the respective chart based coding modes.

At (S2140), the 3D mesh frame is reconstructed according to at least the respective geometry information associated with the plurality of 2D charts.

In some embodiments, the chart based coding modes include at least a sampling based coding mode, a reordering based coding mode and a raw chart coding mode.

In some examples, in response to a first 2D chart of the sampling based coding mode, a first geometry map is decoded from the bitstream using an image decoder and/or a video decoder. 3D coordinates and UV coordinates of first vertices in the first 2D chart are determined according to the first geometry map.

In some examples, in response to a second 2D chart of the reordering based coding mode, a second geometry map, and an UV map are decoded from the bitstream using an image decoder and/or a video decoder. 3D coordinates of second vertices in the second 2D chart are determined according to the second geometry map, and UV coordinates of the second vertices in the second 2D chart are determined according to the UV map.

In some examples, a combined 2D geometry map is decoded from the bitstream. The combined 2D geometry map includes a first 2D map for a first 2D chart in the sampling based coding mode, and a second 2D map for a second 2D chart in the reordering based coding mode. Further, a first signal indicating a first position for the first 2D map in the combined 2D geometry map, and a second signal indicating a second position for the second 2D map in the combined 2D geometry map are decoded from the bitstream. According to the sampling based coding mode, first geometry information associated with the first 2D chart is determined based on the first 2D map at the first position of the combined 2D geometry map. According to the reordering based coding mode, second geometry information associated with the second 2D chart is determined based on the second 2D map at the second position of the combined 2D geometry map.

In some examples, in response to a third 2D chart of the raw chart coding mode, UV coordinates and 3D coordinates of third vertices of the third 2D chart are decoded from the bitstream without using an image decoder or a video decoder.

In an example, an index is decoded from a sequence header for a sequence of 3D mesh frames including the 3D mesh frame. The index in the sequence header indicates a chart based coding mode for the plurality of 2D charts, and other 2D charts parameterized from other 3D mesh frames in the sequence of 3D mesh frames.

In another example, an index is decoded from a frame header for the 3D mesh frame, the index in the frame header indicates a chart based coding mode respectively for the plurality of 2D charts parameterized from the 3D mesh frame.

In another example, an index is decoded from a first header of a first portion of the bitstream for carrying a first mesh segment of the 3D mesh frame. The first mesh segment is parameterized into first one or more 2D charts in the plurality of 2D charts, the index indicates a chart based coding mode respectively for the first one or more 2D charts.

In another example, respective indices associated with the plurality of 2D charts are decoded from the bitstream, the respective indices indicate the respective chart based coding modes for the plurality of 2D charts.

Then, the process proceeds to (S2199) and terminates.

The process (2100) can be suitably adapted. Step(s) in the process (2100) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 22 shows a computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
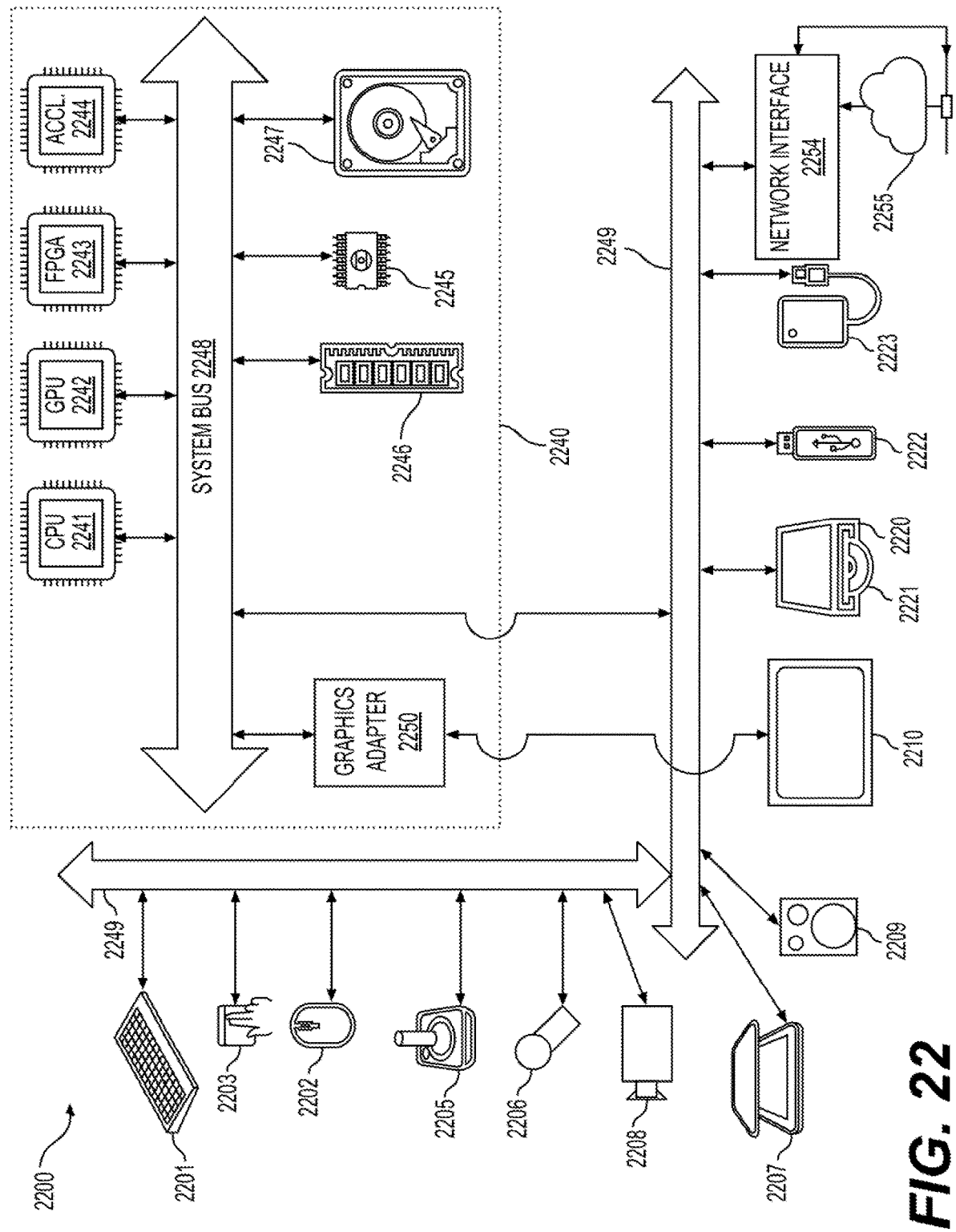
FIG. 22 is a schematic illustration of a computer system in some examples.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface (2254) to one or more communication networks (2255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), graphics adapters (2250), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). In an example, the screen (2210) can be connected to the graphics adapter (2250). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can be also be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2200), and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various embodiments of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hardwired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh decompression, comprising:
receiving a bitstream carrying a three dimensional (3D) mesh frame, the 3D mesh frame representing a surface of an object with polygons, the polygons being defined by vertices and edges connecting the vertices, the 3D mesh frame being parameterized into a plurality of two dimensional (2D) charts in a 2D UV atlas, the vertices being mapped to 2D vertices in the 2D UV atlas, the 2D vertices forming the plurality of 2D charts in the 2D UV atlas;
determining respective chart based coding modes for the plurality of 2D charts according to one or more indices decoded from the bitstream, the respective chart based coding modes comprising at least a first coding mode for coding a first 2D chart in the 2D UV atlas and a second coding mode for coding a second 2D chart in the 2D UV atlas, the first 2D chart and the second 2D chart occupying different portions in the 2D UV atlas, the first coding mode being different from the second coding mode;
decoding, from the bitstream, at least respective geometry information associated with the plurality of 2D charts according to the respective chart based coding modes; and
reconstructing, the 3D mesh frame according to the respective geometry information associated with the plurality of 2D charts.

2. The method of claim 1, wherein the chart based coding modes comprise at least a sampling based coding mode, a reordering based coding mode and a raw chart coding mode.

3. The method of claim 2, wherein when the first 2D chart of the plurality of 2D charts is associated with the sampling based coding mode, the method comprises:
decoding, using an image decoder and/or a video decoder, a first geometry map from the bitstream; and
determining, 3D coordinates and UV coordinates of first vertices in the first 2D chart according to the first geometry map.

4. The method of claim 2, wherein when the second 2D chart of the plurality of 2D charts is associated with the reordering based coding mode, the method comprises:
decoding, using an image decoder and/or a video decoder, a second geometry map, and an UV map from the bitstream;
determining, 3D coordinates of second vertices in the second 2D chart according to the second geometry map; and
determining, UV coordinates of the second vertices in the second 2D chart according to the UV map.

5. The method of claim 2, further comprising:
decoding, a combined 2D geometry map from the bitstream, the combined 2D geometry map comprising a first 2D map for the first 2D chart in the sampling based coding mode, and a second 2D map for the second 2D chart in the reordering based coding mode;
decoding a first signal indicating a first position for the first 2D map in the combined 2D geometry map, and a second signal indicating a second position for the second 2D map in the combined 2D geometry map;
determining, according to the sampling based coding mode, first geometry information associated with the first 2D chart based on the first 2D map at the first position of the combined 2D geometry map; and
determining, according to the reordering based coding mode, second geometry information associated with the second 2D chart based on the second 2D map at the second position of the combined 2D geometry map.

6. The method of claim 2, wherein when a third 2D chart of the plurality of 2D charts is associated with the raw chart coding mode, the method comprises:
decoding, from the bitstream, UV coordinates and 3D coordinates of third vertices of the third 2D chart without using an image decoder or a video decoder.

7. The method of claim 1, wherein the determining the respective chart based coding modes for the plurality of 2D charts according to the one or more indices decoded from the bitstream further comprises:
decoding an index from a sequence header for a sequence of 3D mesh frames including the 3D mesh frame, the index in the sequence header indicating a chart based coding mode for the plurality of 2D charts, and other 2D charts parameterized from other 3D mesh frames in the sequence of 3D mesh frames.

8. The method of claim 1, wherein the determining the respective chart based coding modes for the plurality of 2D charts according to the one or more indices decoded from the bitstream further comprises:
decoding an index from a frame header for the 3D mesh frame, the index in the frame header indicating a chart based coding mode respectively for the plurality of 2D charts.

9. The method of claim 1, wherein the determining the respective chart based coding modes for the plurality of 2D charts according to the one or more indices decoded from the bitstream further comprises:
decoding an index from a first header of a first portion of the bitstream for carrying a first mesh segment of the 3D mesh frame, the first mesh segment being parameterized into first one or more 2D charts in the plurality of 2D charts, the index indicating a chart based coding mode respectively for the first one or more 2D charts.

10. The method of claim 1, wherein the determining the respective chart based coding modes for the plurality of 2D charts according to the one or more indices decoded from the bitstream further comprises:

decoding respective indices associated with the plurality of 2D charts, the respective indices indicating the respective chart based coding modes for the plurality of 2D charts.

11. A method of mesh compression, comprising:
parameterizing a three dimensional (3D) mesh frame into a plurality of two dimensional (2D) charts in a 2D UV atlas, the 3D mesh frame representing a surface of an object with polygons, the polygons being defined by vertices and edges connecting the vertices, the vertices being mapped to 2D vertices in the 2D UV atlas, the 2D vertices forming the plurality of 2D charts in the 2D UV atlas;
determining respective chart based coding modes for the plurality of 2D charts, the respective chart based coding modes comprising at least a first coding mode for coding a first 2D chart in the 2D UV atlas and a second coding mode for coding a second 2D chart in the 2D UV atlas, the first 2D chart and the second 2D chart occupying different portions in the 2D UV atlas, the first coding mode being different from the second coding mode; and
encoding at least geometry information associated with the plurality of 2D charts into a bitstream according to the respective chart based coding modes.

12. The method of claim 11, wherein the chart based coding modes comprise at least a sampling based coding mode, a reordering based coding mode and a raw chart coding mode.

13. The method of claim 12, wherein when the sampling based coding mode is determined for the first 2D chart, the method comprises:
generating a first geometry map of the first 2D chart based on the sampling based coding mode; and
encoding, using an image encoder and/or a video encoding, the first geometry map into the bitstream.

14. The method of claim 12, wherein when the reordering based coding mode is determined for the second 2D chart, the method comprises:
reordering second vertices in the second 2D chart based on an order;
arranging 3D coordinates of the second vertices into a second geometry map according to the order;
arranging UV coordinates of the second vertices into an UV map according to the order; and
encoding at least the second geometry map and the UV map into the bitstream using an image encoder and/or a video encoder.

15. The method of claim 12, further comprising:
determining to use the sampling based coding mode for the first 2D chart and to use the reordering based coding mode for the second 2D chart;
sampling the first 2D chart to generate at least a first geometry map that associates 3D coordinates of first vertices in the first 2D chart with UV coordinates of the first vertices;
determining an order for ordering second vertices in the second 2D chart;
arranging 3D coordinates of the second vertices into a second geometry map according to the order;
merging the first geometry map and the second geometry map into a combined 2D geometry map without overlapping; and
encoding the combined 2D geometry map into the bitstream using an image encoder and/or a video encoder.

16. The method of claim 15, further comprising:
encoding, into the bitstream, a first signal indicating a first position for the first geometry map in the combined 2D geometry map, and a second signal indicating a second position for the second geometry map in the combined 2D geometry map.

17. The method of claim 12, wherein when a third 2D chart of the plurality of 2D charts is associated with the raw chart coding mode, the method comprises:
encoding, into the bitstream, UV coordinates and 3D coordinates of third vertices of the third 2D chart without using an image encoder or a video encoder.

18. The method of claim 11, further comprising:
encoding, into the bitstream, respective indices in association with the plurality of 2D charts, the respective indices indicating the respective chart based coding modes for the plurality of 2D charts.

19. The method of claim 11, wherein the determining comprises:
determining the respective chart based coding modes for the plurality of 2D charts based on respective characteristics of the plurality of 2D charts.

20. A method of processing mesh data, the method comprising:
processing a bitstream that includes the mesh data according to a format rule, wherein:
the bitstream carries at least a three dimensional (3D) mesh frame, the 3D mesh frame representing a surface of an object with polygons, the polygons being defined by vertices and edges connecting the vertices, the 3D mesh frame being parameterized into a plurality of two dimensional (2D) charts in a 2D UV atlas, the vertices being mapped to 2D vertices in the 2D UV atlas, the 2D vertices forming the plurality of 2D charts in the 2D UV atlas; and
the format rule specifies that:
respective chart based coding modes for the plurality of 2D charts are determined, the respective chart based coding modes comprising at least a first coding mode for coding a first 2D chart in the 2D UV atlas and a second coding mode for coding a second 2D chart in the 2D UV atlas, the first 2D chart and the second 2D chart occupying different portions in the 2D UV atlas, the first coding mode being different from the second coding mode;
at least respective geometry information associated with the plurality of 2D charts is decoded according to the respective chart based coding modes; and
the 3D mesh frame is reconstructed according to the respective geometry information associated with the plurality of 2D charts.

* * * * *